US010940910B2

(12) United States Patent
Noda et al.

(10) Patent No.: US 10,940,910 B2
(45) Date of Patent: Mar. 9, 2021

(54) BICYCLE COMPONENT AND MOUNTING STRUCTURE FOR BICYCLE COMPONENT

(71) Applicant: Shimano Inc., Osaka (JP)

(72) Inventors: Shinichiro Noda, Osaka (JP); Takaaki Fujiwara, Osaka (JP); Kensuke Tagaya, Osaka (JP)

(73) Assignee: Shimano Inc., Osaka (JP)

( * ) Notice: Subject to any disclaimer, the term of this patent is extended or adjusted under 35 U.S.C. 154(b) by 233 days.

(21) Appl. No.: 16/047,323

(22) Filed: Jul. 27, 2018

(65) Prior Publication Data

US 2019/0039677 A1 Feb. 7, 2019

(30) Foreign Application Priority Data

Aug. 4, 2017 (JP) .................................. 2017-151595
Nov. 15, 2017 (JP) .................................. 2017-220331

(51) Int. Cl.
*B62K 19/34* (2006.01)
*B62M 6/55* (2010.01)
*B62M 6/90* (2010.01)

(52) U.S. Cl.
CPC ............... *B62K 19/34* (2013.01); *B62M 6/55* (2013.01); *B62M 6/90* (2013.01)

(58) Field of Classification Search
CPC .................................. B62K 19/34; B62M 6/55
See application file for complete search history.

(56) References Cited

U.S. PATENT DOCUMENTS

| 8,393,794 | B1* | 3/2013 | Shiraishi | B62K 19/34 |
| | | | | 384/458 |
| 8,678,417 | B1* | 3/2014 | Chang | B62M 6/55 |
| | | | | 280/281.1 |
| 9,517,811 | B1* | 12/2016 | Shiraishi | F16C 35/077 |
| 10,036,465 | B2* | 7/2018 | Watarai | F16H 57/025 |
| 2010/0243364 | A1 | 9/2010 | Hayashi et al. | |
| 2013/0165283 | A1* | 6/2013 | Braun | B62K 19/34 |
| | | | | 474/112 |
| 2014/0084564 | A1 | 3/2014 | Chang | |
| 2014/0210318 | A1* | 7/2014 | Yao | B62K 19/34 |
| | | | | 310/67 R |
| 2015/0210349 | A1* | 7/2015 | Liu | B62M 6/55 |
| | | | | 180/206.4 |
| 2015/0329170 | A1 | 11/2015 | Kondo | |
| 2016/0303961 | A1 | 10/2016 | Hendey et al. | |
| 2017/0016526 | A1 | 1/2017 | Watarai et al. | |
| 2017/0057582 | A1* | 3/2017 | Nishikawa | B62J 13/04 |
| 2017/0183057 | A1* | 6/2017 | Gibbings | B62M 6/55 |

(Continued)

FOREIGN PATENT DOCUMENTS

CN 202574542 U 12/2012
CN 106741501 A 5/2017
DE 10 2016 112 778 A1 1/2017

(Continued)

*Primary Examiner* — Tony H Winner
(74) *Attorney, Agent, or Firm* — Global IP Counselors, LLP

(57) ABSTRACT

A bicycle component includes a housing that supports a crankshaft of a bicycle and a first mounting portion that mounts the housing on a frame of the bicycle. The first mounting portion is configured to apply force to the housing and the frame that moves the housing and the frame away from each other.

25 Claims, 20 Drawing Sheets

(56) References Cited

U.S. PATENT DOCUMENTS

| | | | |
|---|---|---|---|
| 2017/0314593 A1* | 11/2017 | Mano | B62M 6/45 |
| 2018/0111660 A1* | 4/2018 | Liu | B62M 6/55 |

FOREIGN PATENT DOCUMENTS

| | | |
|---|---|---|
| JP | 1-195196 A | 8/1989 |
| JP | 5-238461 A | 9/1993 |
| JP | 3007728 U | 11/1994 |
| JP | 2002-331983 A | 11/2002 |
| JP | 4416620 B2 | 12/2009 |
| JP | 2010-235058 A | 10/2010 |
| JP | 2017-24700 A | 2/2017 |
| JP | 2017-197132 A | 11/2017 |
| WO | 2014/102922 A1 | 7/2014 |

\* cited by examiner

BICYCLE COMPONENT AND MOUNTING STRUCTURE FOR BICYCLE COMPONENT

CROSS-REFERENCE TO RELATED APPLICATIONS

This application claims priority to Japanese Patent Application No. 2017-151595, filed on Aug. 4, 2017, and Japanese Patent Application No. 2017-220331 filed on Nov. 15, 2017. The entire disclosures of Japanese Patent Application Nos. 2017-151595 and 2017-220331 are hereby incorporated herein by reference.

BACKGROUND

Field of the Invention

The present invention generally relates to a bicycle component and a mounting structure for a bicycle component.

Background Information

A drive unit is a bicycle component that includes a motor that assists propulsion of a bicycle. One example of such a drive unit is disclosed in Japanese Patent No. 4416620 (hereinafter patent document 1), which describes a motor unit including a mounting portion that allows for mounting on a bracket provided on a frame of a bicycle. The mounting portion is inserted between two side plates of the bracket. The side plates and the mounting portion are fastened by bolts to fasten the motor unit to the bracket.

SUMMARY

In the motor unit described above, manufacturing tolerances may result in gaps formed between the side plates and the mounting portion, which are fastened by the bolts. In this case, the motor unit may rattle on the two side plates when the bicycle is traveling.

One object of the present disclosure is to provide a bicycle component that can be stably mounted on a frame and a mounting structure for the bicycle component.

A bicycle component in accordance with a first aspect of the present disclosure includes a housing that supports a crankshaft of a bicycle and a first mounting portion that mounts the housing on a frame of the bicycle. The first mounting portion is configured to apply force to the housing and the frame that moves the housing and the frame away from each other. In accordance with the first aspect, the bicycle component is stably mounted on the frame.

In accordance with a second aspect of the present disclosure, the bicycle component according to the first aspect of the present disclosure is configured so that the first mounting portion includes a first member and a second member. The first member includes a male thread and is configured to press the housing. The second member includes a female thread joined with the male thread of the first member and is configured to press the frame. In accordance with the second aspect, the first member and the second member apply force in a direction that moves the housing and the frame away from each other in a preferred manner.

In accordance with a third aspect of the present disclosure, in the bicycle component according to the second aspect, the first member is configured to be coupled to the second member and moved to press the housing with a first end surface in a first direction. In accordance with the third aspect, the first member is coupled to the second member and moved so that the first end surface of the first member presses the housing.

In accordance with a fourth aspect of the present disclosure, in the bicycle component according to the third aspect, the first member is configured to support the housing in a direction intersecting the first direction. In accordance with the fourth aspect, the housing is supported by the first member in a preferred manner.

In accordance with a fifth aspect of the present disclosure, the bicycle component according to the third or fourth aspect is configured so that the first member includes a first hole extending in the first direction, and the housing includes an insertion portion inserted in the first hole of the first member. In accordance with the fifth aspect, the insertion portion of the housing is inserted into the first hole of the first member so that the first member supports the housing.

In accordance with a sixth aspect of the present disclosure, the bicycle component according to the third or fourth aspect is configured so that the housing includes a second hole extending in the first direction and the first member includes an end in the first direction inserted into the second hole. In accordance with the sixth aspect, the end of the first member is inserted into the second hole of the housing so that the first member supports the housing.

In accordance with a seventh aspect of the present disclosure, the bicycle component according to any one of the second to sixth aspects is configured so that at least a part of the second member is provided between the housing and the frame. In accordance with the seventh aspect, the second member stably couples the housing and the frame.

In accordance with an eighth aspect of the present disclosure, the bicycle component according to any one of the second to seventh aspects is configured so that at least a part of the second member is provided between the first member and the frame. In accordance with the eighth aspect, the second member stably couples the first member and the frame.

In accordance with a ninth aspect of the present disclosure, in the bicycle component according to any one of the second to eighth aspects, the second member is configured to contact part of the frame in a direction intersecting the first direction. In accordance with the ninth aspect, the second member applies force in the first direction to the frame in a preferred manner.

In accordance with a tenth aspect of the present disclosure, the bicycle component according to any one of the second to ninth aspects is configured so that at least one of the first member or the second member further includes a tool engagement portion that is engageable with a tool. In accordance with the tenth aspect, the tool allows the bicycle component to be easily mounted on the frame.

In accordance with an eleventh aspect of the present disclosure, the bicycle component according to the tenth aspect is configured so that the tool engagement portion is defined by at least one of an inner circumferential portion or an outer circumferential portion of the first member. In accordance with the eleventh aspect, the tool can easily engage the tool engagement portion.

In accordance with a twelfth aspect of the present disclosure, the bicycle component according to the first aspect is configured so that the first mounting portion includes a first part joined with to the housing and a second part configured to press the frame away from the housing. In accordance with the twelfth aspect, the first part and the second part apply force that moves the housing and the frame away from each other in a preferred manner.

In accordance with a thirteenth aspect of the present disclosure, the bicycle component according to the twelfth aspect is configured so that the housing includes a first threaded portion, the first part of the first mounting portion includes a second threaded portion joined with the first threaded portion, and the second part of the first mounting portion extends in a second direction intersecting a first direction in which the second threaded portion is joined with and moved by the first threaded portion. In accordance with the thirteenth aspect, the second threaded portion is joined with and moved by the first threaded portion to press the housing with the second part.

In accordance with a fourteenth aspect of the present disclosure, the bicycle component according to the thirteenth aspect is configured so that the second threaded portion includes a female thread, and the first threaded portion of the housing is provided with a male thread joined with the female thread of the second threaded portion. In accordance with the fourteenth aspect, when the female thread of the second threaded portion is joined with and moved by the male thread of the first threaded portion to press the housing with the second part.

In accordance with a fifteenth aspect of the present disclosure, the bicycle component according to the thirteenth or fourteenth aspect is configured so that the first threaded portion of the housing surrounds an outer circumferential surface of the crankshaft about a rotation axis of the crankshaft. In accordance with the fifteenth aspect, the first mounting portion stably mounts the housing on the frame.

In accordance with a sixteenth aspect of the present disclosure, the bicycle component according to any one of the thirteenth to fifteenth aspects is configured so that the first mounting portion includes an annular member including an inner circumferential portion and an outer circumferential portion, the first part is defined by the inner circumferential portion, and the second part is defined by the outer circumferential portion. In accordance with the sixteenth aspect, the first part defined by the inner circumferential portion of the annular member and the second part defined by the outer circumferential portion of the annular member apply force that moves the housing and the frame away from each other in a preferred manner.

In accordance with a seventeenth aspect of the present disclosure, in the bicycle component according to any one of the thirteenth to sixteenth aspects, the first mounting portion further includes a tool engagement portion that is engageable with a tool. In accordance with the seventeenth aspect, the tool allows the bicycle component to be easily mounted on the frame.

In accordance with an eighteenth aspect of the present disclosure, the bicycle component according to any one of the first to seventeenth aspects further includes a second mounting portion that mounts the housing on the frame of the bicycle. The first mounting portion and the second mounting portion are spaced apart from each other in a predetermined direction. In accordance with the eighteenth aspect, the first mounting portion and the second mounting portion stably mount the bicycle component on the frame.

In accordance with a nineteenth aspect of the present disclosure, the bicycle component according to the eighteenth aspect is configured so that the second mounting portion includes a threaded hole formed in the housing, and a coupling member extended through the frame and coupled to the threaded hole. In accordance with the nineteenth aspect, the second mounting portion stably mounts the bicycle component on the frame.

In accordance with a twentieth aspect of the present disclosure, in the bicycle component according to any one of the first to nineteenth aspects, the housing accommodates at least part of a motor that assists propulsion of a bicycle. In accordance with the twentieth aspect, the bicycle component accommodating the motor is stably mounted on the frame.

In accordance with a twenty-first aspect of the present disclosure, in the bicycle component according to any one of the first to twentieth aspects, the housing is configured to be at least partially accommodated in the frame. In accordance with the twenty-first aspect, the design of the bicycle can be improved.

A mounting structure for a bicycle component in accordance with a twenty-second aspect of the present disclosure includes a bicycle frame; and a first mounting portion. The first mounting portion of the bicycle component can be configured in accordance with any one of the first to twenty-first aspects. Preferably, the bicycle frame includes a frame main body and a mounting member that is separate from the frame main body. The first mounting portion mounts a housing on the bicycle frame of the bicycle. The first mounting portion is configured to apply force to the housing and the bicycle frame that moves the housing and the bicycle frame away from each other. The first mounting portion includes a first part joined with to the housing, and a second part configured to press the mounting member away from the housing. In accordance with the twenty-second aspect, the mounting structure of the bicycle component stably mounts the bicycle component on the frame.

A mounting structure for a bicycle component in accordance with a twenty-third aspect of the present disclosure includes the first mounting portion of the bicycle component in accordance with any one of the twelfth to seventeenth aspects and the frame. The frame includes a frame main body and a mounting member separate from the frame main body, and the second part presses the mounting member away from the housing. In accordance with the twenty-third aspect, a portion pressed against the second part by the mounting member is formed on the frame in a preferred manner.

In accordance with a twenty-fourth aspect of the present disclosure, the mounting structure in accordance with the twenty-third aspect is configured so that the mounting member is annular and includes an inner circumferential portion and an outer circumferential portion, the inner circumferential portion contacts the first mounting portion, and the outer circumferential portion is mounted on the frame main body. In accordance with the twenty-fourth aspect, the bicycle component is stably mounted on the frame.

In accordance with a twenty-fifth aspect of the present disclosure, the mounting structure in accordance with the twenty-third or twenty-fourth aspect further includes a bolt that mounts the mounting member on the frame main body. In accordance with the twenty-fifth aspect, the mounting member is mounted on the frame main body by the bolt.

The bicycle component in according to the present disclosure can be stably mounted on the frame.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 including a bicycle component 40 in accordance with a first embodiment will now be described with reference to FIGS. 1 to 9. The bicycle 10 is a road bike. However, the present disclosure is also applicable to a bicycle other than a road bike such as a mountain bike and a city bike. The vertical direction of the bicycle 10 is the vertical direction in a state in which the bicycle 10 is ridable and held upright on a level surface. The sideward direction of the bicycle 10 is the sideward direction as viewed in the traveling direction of the bicycle 10 in a state in which the bicycle 10 is ridable and held upright on a level surface.

Figure 1:
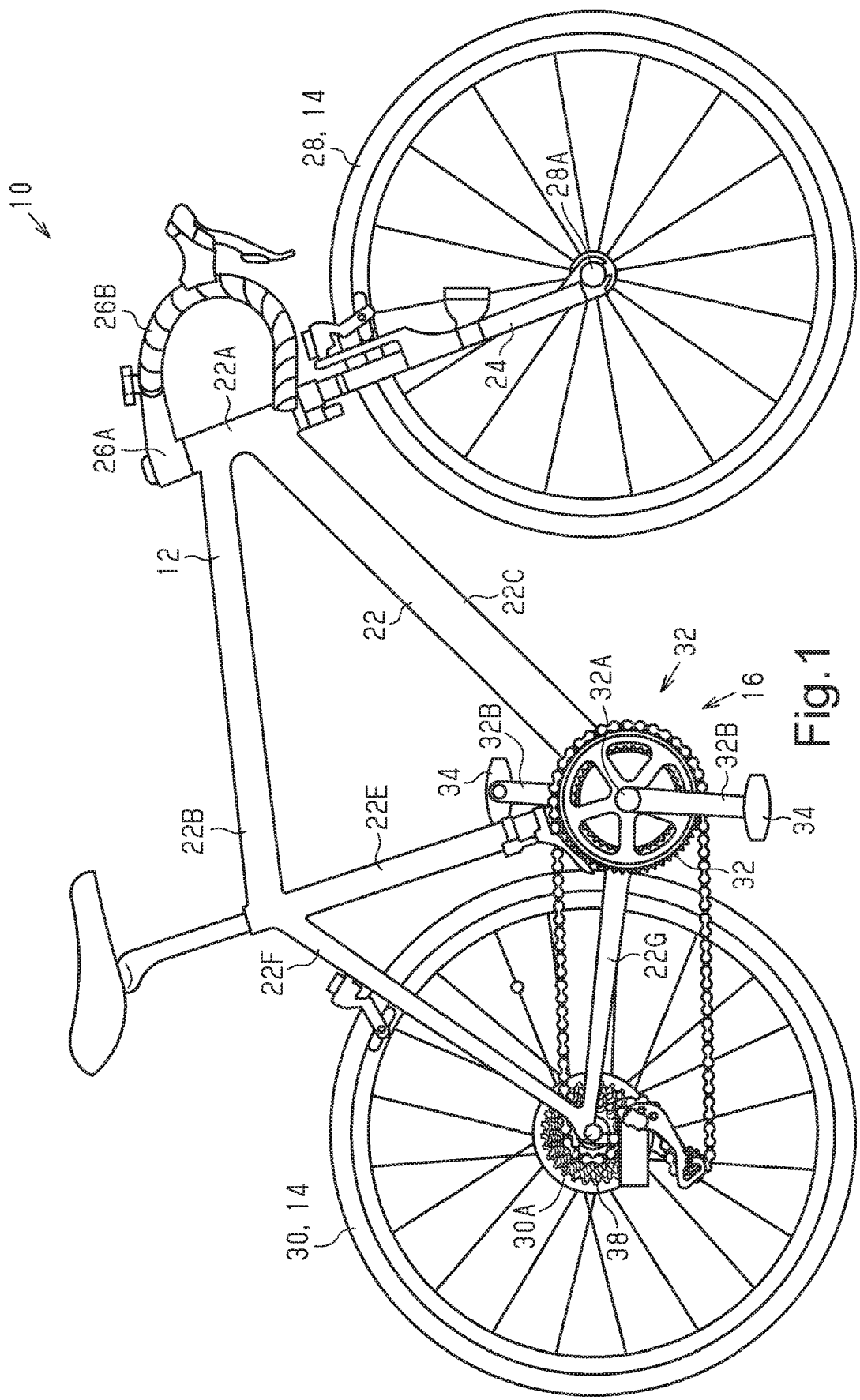
FIG. 1 is a side elevational view of a bicycle including a bicycle component in accordance with a first embodiment.
Figure 2:
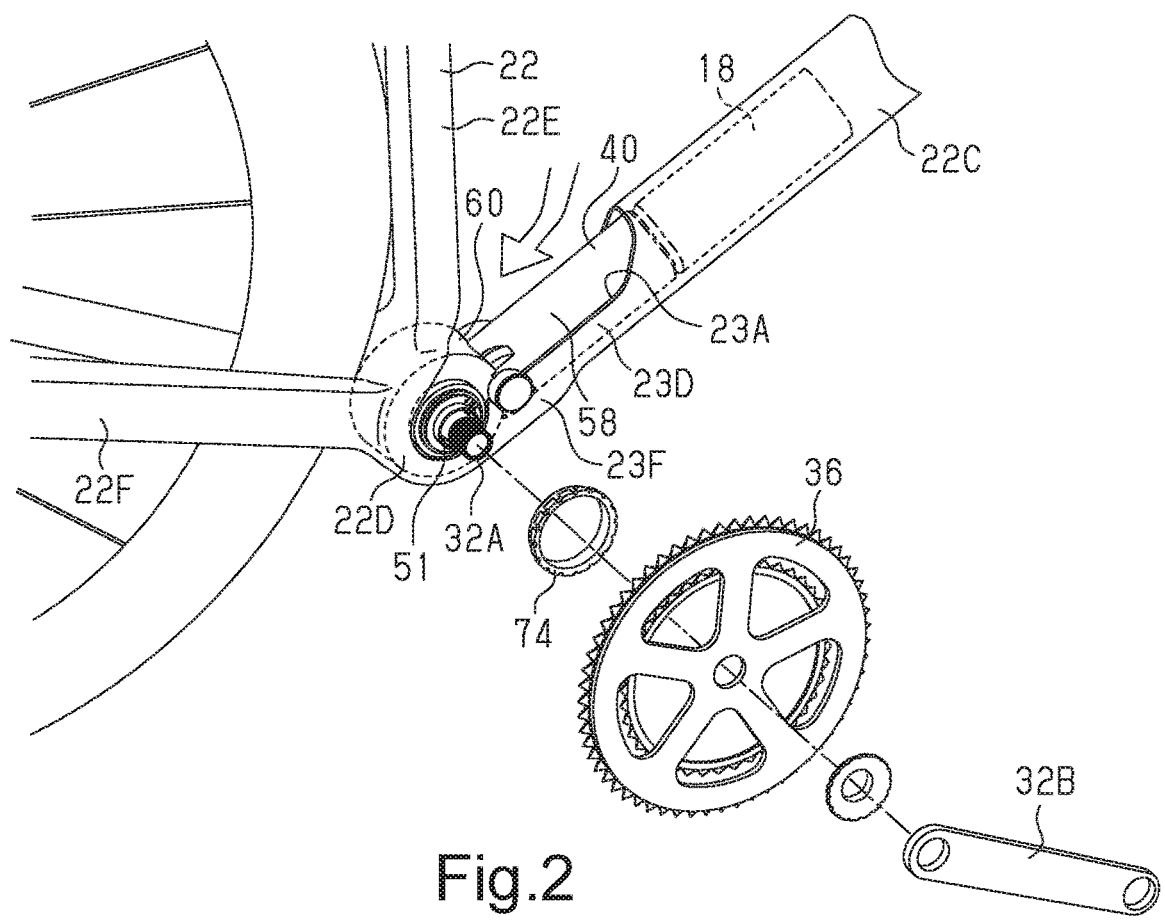
FIG. 2 is a perspective view of a portion in the vicinity of a crankshaft of the bicycle illustrated in FIG. 1.

As shown in FIGS. 1 and 2, the bicycle 10 includes a bicycle body 12, a pair of wheels 14, a drive mechanism 16, a battery 18 and the bicycle component 40. In the present embodiment, the bicycle component 40 is a bicycle drive unit. The bicycle body 12 includes a frame 22, a front fork 24 and a handlebar 26B. The front fork 24 is connected to the frame 22. The handlebar 26B is connected in an attachable and removable manner to the front fork 24 by a stem 26A. The front fork 24 is supported by the frame 22.

The frame 22 includes a head tube 22A, a top tube 22B, a down tube 22C, a component mounting portion 22D, a seat tube 22E, a seat stay 22F and a chain stay 22G. The component mounting portion 22D is connected to the down tube 22C, the seat tube 22E, and the seat stay 22F.

The wheels 14 include a front wheel 28 and a rear wheel 30. The front wheel 28 includes an axle 28A connected to an end of the front fork 24. The rear wheel 30 includes an axle 30A connected to a rear end of the frame 22.

The drive mechanism 16 includes a crank 32 and a pair of pedals 34. The crank 32 includes a crankshaft 32A and a pair of crank arms 32B. The drive mechanism 16 transmits manual driving force, which is applied to the pedals 34, to the rear wheel 30. The drive mechanism 16 includes a front rotation body 36 coupled to an output portion 51 of the bicycle component 40. The front rotation body 36 includes a sprocket, a pulley, or a bevel gear. The drive mechanism 16 is configured to transmit rotation of the crank 32 through, for example, a chain, a belt, or a shaft, to a rear rotation body 38 coupled to the rear wheel 30. The rear rotation body 38 includes a sprocket, a pulley, or a bevel gear. A one-way clutch (not shown) is provided between the rear rotation body 38 and the rear wheel 30. The one-way clutch is configured to allow forward rotation of the rear rotation body 38 in case the rear wheel 30 rotates forward and restrict rearward rotation of the rear rotation body 38 in case the rear wheel 30 rotates rearward. The front rotation body 36 can include a plurality of front sprockets. The rear rotation body 38 can include a plurality of rear sprockets. The crankshaft 32A can be included in the bicycle component 40.

As shown in FIG. 2, the component mounting portion 22D is connected to the frame 22 at each of the lower end of the down tube 22C, the lower end of the seat tube 22E, and the front end of the chain stay 22G. The component mounting portion 22D is configured to accommodate at least part of the bicycle component 40. Preferably, the component mounting portion 22D is formed integrally with the down tube 22C, the seat tube 22E, and the chain stay 22G but can be connected through welding, adhesion, or the like. The frame 22 includes a first open portion 23A to accommodate the bicycle component 40 and the battery 18 in the frame 22. The first open portion 23A opens toward the upper side of the bicycle 10, and is provided over the component mounting portion 22D, the portion of the seat tube 22E connected to the component mounting portion 22D, and the portion of the down tube 22C connected to the component mounting portion 22D. The component mounting portion 22D includes a first side wall 23D, a second side wall 23E and a bottom wall 23F. The first side wall 23D is located at the right side of the bicycle 10. The second side wall 23E is located at the left side of the bicycle 10 (refer to FIG. 4). The bottom wall 23F is located at the lower side of the bicycle 10. The first side wall 23D and the second side wall 23E are connected to the down tube 22C, the seat tube 22E and the chain stay 22G. The bottom wall 23F is connected to the lower end of the first side wall 23D, the lower end of the second side wall 23E, the down tube 22C and the chain stay 22G. The first open portion 23A includes an opening extending in the side walls 23D and 23E of the component mounting portion 22D to where the crankshaft 32A is located. Preferably, a cover 23B (refer to FIG. 4) is attached to the first open portion 23A. The cover 23B closes the opening of the first open portion 23A. The bottom wall 23F of the component mounting portion 22D includes a second open portion 23C (refer to FIG. 6). The bicycle component 40 is inserted into the opening of the first open portion 23A from the upper side and mounted on the frame 22. The second open portion 23C includes an opening that extends in the widthwise direction of the bicycle 10, for example, to the first side wall 23D and the second side wall 23E.

The battery 18 includes one or more battery cells. The battery cells include rechargeable batteries. The battery 18 is mounted on the bicycle 10 to supply the bicycle component 40 with electrical power. The battery 18 is accommodated in the frame 22. Preferably, the battery 18 is accommodated in the down tube 22C.

At least part of the bicycle component 40 is arranged inside the frame 22. The bicycle component 40 of the present embodiment is located in the interior of the component mounting portion 22D. One end of the bicycle component 40 is provided in the part of the component mounting portion 22D connected to the seat stay 22F and the chain stay 22G. The other end of the bicycle component 40 is connected to the battery 18. The bicycle component 40 and the battery 18 are aligned in the longitudinal direction of the down tube 22C.

Figure 3:
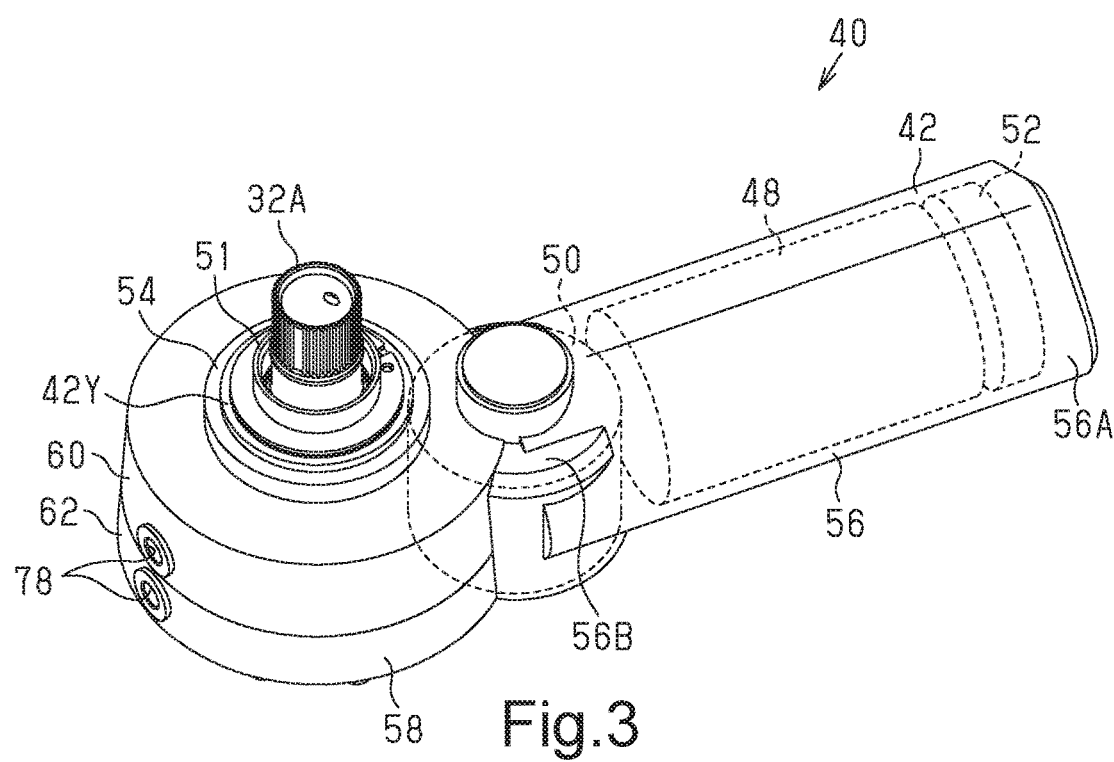
FIG. 3 is a perspective view of the bicycle component in accordance with the first embodiment.
Figure 4:
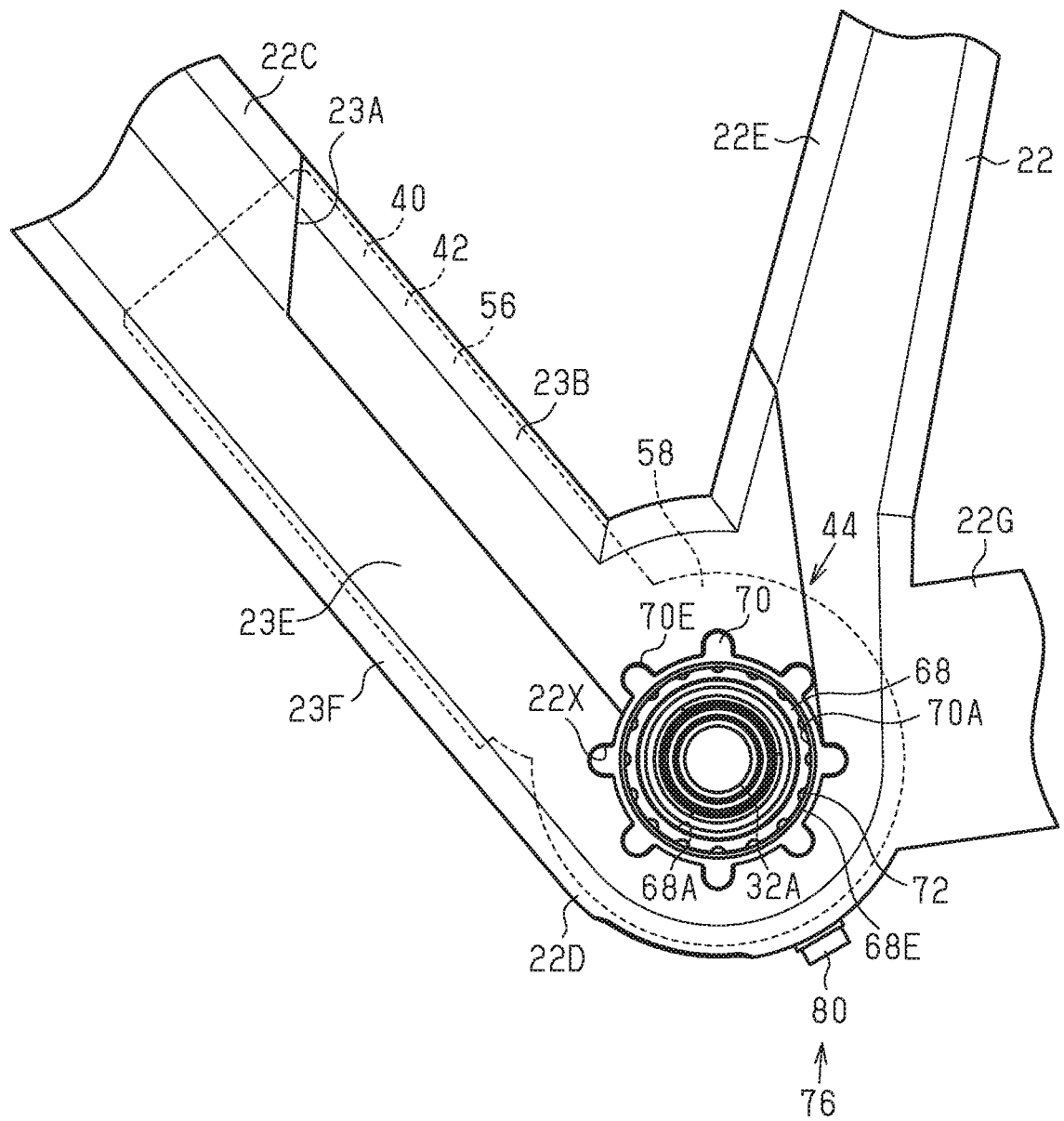
FIG. 4 is a left side elevational view of the portion in the vicinity of the crankshaft of the bicycle illustrated in FIG. 2.
Figure 5:
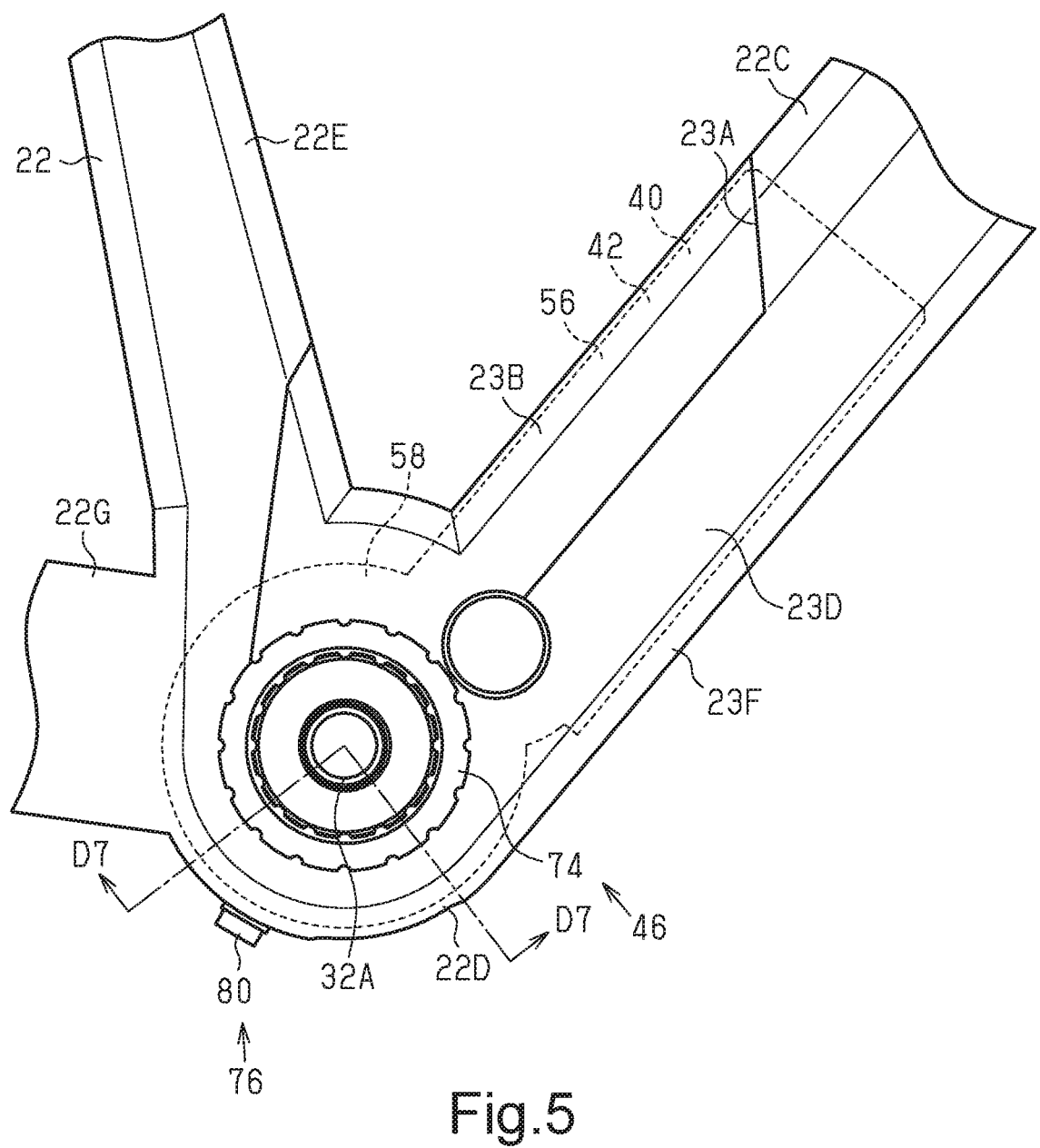
FIG. 5 is a right side elevational view of the portion in the vicinity of the crankshaft of the bicycle illustrated in FIG. 2.

As shown in FIGS. 3 to 5, the bicycle component 40 includes a housing 42 and a first mounting portion 44. The first mounting portion 44 is configured to mount the housing 42 on the bicycle 10. The bicycle component 40 further includes a second mounting portion 46 that is configured to mount the housing 42 on the frame 22 of the bicycle 10. The housing 42 supports the crankshaft 32A of the bicycle 10. The housing 42 includes a support 54 that supports the crankshaft 32A. The housing 42 accommodates at least part of a motor 48. The two axial ends of the crankshaft 32A each project out of the housing 42.

The motor 48 is provided in the housing 42. In this embodiment, the motor 48 is provided in the housing 42. The housing 42 is configured so that it can be at least partially accommodated in the frame 22. The motor 48 is included in the bicycle component 40. The motor 48 is configured to assist in propulsion of the bicycle 10. The motor 48 includes an electric motor. The motor 48 is a brushless motor. The bicycle component 40 includes a reduction gear 50 and an electronic controller 52. The reduction gear 50 reduces the speed of the rotation generated by the motor 48 and then outputs the rotation. In one example, the motor 48 includes an output shaft of which axial direction is orthogonal to the axial direction of the crankshaft 32A. Preferably, in this case, the reduction gear 50 converts the rotation of the output shaft of the motor 48 to rotation in a direction orthogonal to the output shaft of the motor 48. The axis of the output shaft of the motor 48 can be orthogonal to or offset from the axis of the crankshaft 32A. The reduction gear 50 can include, for example, bevel gears. The reduction gear 50 can further include a planetary gear mechanism. The reduction gear 50 outputs the rotation of the motor 48 to the output portion 51 that extends around the crankshaft 32A. The rotation of the motor 48 is transmitted by the reduction gear 50 and the output portion 51 to the front rotation body 36.

The controller 52 includes a substrate and a drive circuit. The drive circuit includes an inverter circuit and controls the power supplied from the battery 18 to the motor 48. The controller 52 includes at least one processor that executes predetermined control programs. The processor includes, for example, a central processing unit (CPU) or a micro-processing unit (MPU). The controller 52 can include one or more microcomputers. The controller 52 can further include a memory device and a timer. The memory device stores various types of control programs and information used for various types of processing. The memory device is any computer storage device or any computer readable medium with the sole exception of a transitory, propagating signal. For example, the memory device includes a non-volatile memory device and a non-volatile memory device, and can includes a ROM (Read Only Memory) device, a RAM (Random Access Memory) device, a hard disk, a flash drive, etc.

The housing 42 includes a first accommodation portion 56 and a second accommodation portion 58. The first accommodation portion 56 includes a cylindrical part. The first accommodation portion 56 accommodates the motor 48, a part of the reduction gear 50 and the controller 52. Preferably, one longitudinal end 56A of the first accommodation portion 56 is provided with an electric terminal that electrically connects the battery 18 and the controller 52. Preferably, the second accommodation portion 58 is disc-shaped as viewed in the axial direction of the crankshaft 32A. The second accommodation portion 58 is connected to the other end 56B in a longitudinal direction of a first housing 60. The first accommodation portion 56 can be formed integrally with or separately from the second accommodation portion 58. At least part of the first accommodation portion 56 can be formed integrally with at least part of the second accommodation portion 58. The support 54 is provided in the second accommodation portion 58. The support 54 rotatably supports the crankshaft 32A.

Figure 7:
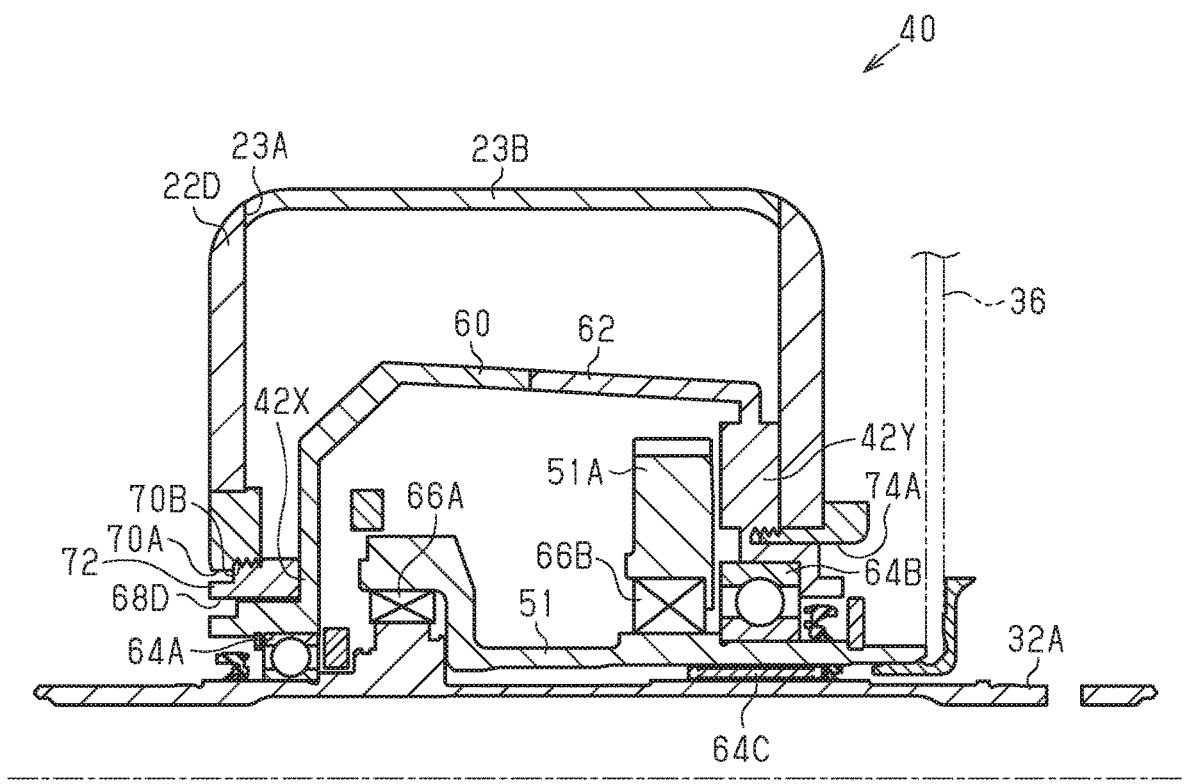
FIG. 7 is a cross-sectional view of the portion in the vicinity of the crankshaft of the bicycle illustrated in FIG. 2 as seen along section along line D7-D7 in FIG. 5.
Figure 7:
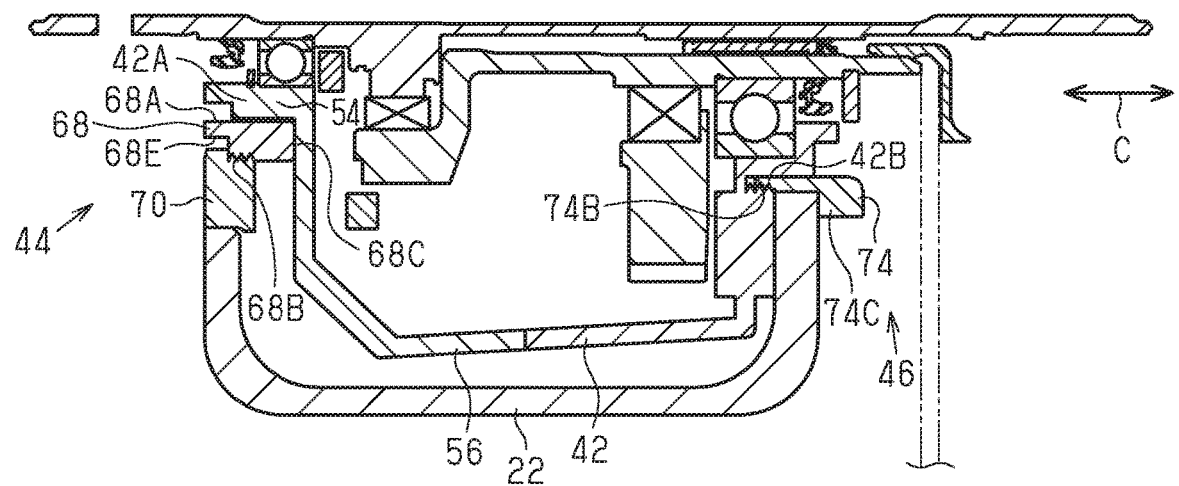

As shown in FIGS. 3 and 7, the housing 42 is formed by the first housing 60 and a second housing 62. The first housing 60 includes one of the side surfaces of the housing 42 in the axial direction of the crankshaft 32A. The second housing 62 includes the other one of the side surfaces of the housing 42 in the axial direction of the crankshaft 32A. The first housing 60 and the second housing 62 are joined to form an accommodation space inside the housing 42. The first housing 60 and the second housing 62 are fixed to each other by, for example, a plurality of bolts.

The bicycle component 40 further includes a first bearing 64A, a second bearing 64B, a first one-way clutch 66A and a second one-way clutch 66B. The first bearing 64A is provided between the first housing 60 and the crankshaft 32A to support the crankshaft 32A rotatably relative to the first housing 60. The second bearing 64B is provided between the second housing 62 and the output portion 51 to support the output portion 51 rotatably relative to the second housing 62. The first bearing 64A and the second bearing 64B are spaced apart from each other in the axial direction of the crankshaft 32A. The first bearing 64A is provided near the end of the housing 42 at one side in the axial direction of the crankshaft 32A. The second bearing 64B is provided near the end of the housing 42 at the other side in the axial direction of the crankshaft 32A.

The output portion 51 is coaxial with the crankshaft 32A. The output portion 51 is cylindrical. The output portion 51 covers part of the outer circumferential surface of the crankshaft 32A. The output portion 51 projects out of the housing 42 at the other side in the axial direction of the crankshaft 32A. The end of the crankshaft 32A at the other side in the axial direction extends from the output portion 51 toward the other side in the axial direction of the crankshaft 32A.

The first one-way clutch 66A is provided between the crankshaft 32A and the output portion 51. The first one-way clutch 66A is provided near the end of the output portion 51 at one side in the axial direction of the crankshaft 32A. Part of the first one-way clutch 66A can be formed integrally with at least one of the crankshaft 32A and the output portion 51. For example, the first one-way clutch 66A includes a roller clutch. In this case, the inner race of the first one-way clutch 66A can be formed integrally with the crankshaft 32A, and the outer race of the first one-way clutch 66A can be formed integrally with the output portion 51.

A third bearing 64C is provided between the crankshaft 32A and the end of the output portion 51 at the other side in the axial direction of the crankshaft 32A. The third bearing 64C includes, for example, a sleeve or a needle bearing. The crankshaft 32A is supported by the second bearing 64B through the third bearing 64C and the output portion 51. Preferably, at least parts of the second bearing 64B and the third bearing 64C are located at overlapping positions in a direction orthogonal to the crankshaft 32A.

The first one-way clutch 66A transmits rotation in a first rotation direction of the crankshaft 32A to the output portion 51, and does not transmit rotation in the first rotation direction of the output portion 51 to the crankshaft 32A. The second one-way clutch 66B is provided between the output portion 51 and a gear 51A for connecting the output portion 51 and the reduction gear 50. The second one-way clutch 66B transmits rotation in a first rotation direction of the motor 48 to the output portion 51, and does not transmit rotation in the first rotation direction of the output portion 51 to the motor 48. The first rotation direction of the crankshaft 32A is the direction in which the crankshaft 32A is rotated when the bicycle 10 is being moved forward. The first rotation direction of the output portion 51 is the direction in which the output portion 51 is rotated when the bicycle 10 is being moved forward. The first rotation direction of the motor 48 is the direction of the rotation of the motor 48 in a case in which the motor 48 moves the bicycle 10 forward. The output portion 51 and the housing 42 are provided with a torque sensor (not shown) that detects the rotation force transmitted to the output portion 51. The torque sensor includes, for example, a strain sensor or a magnetostrictive sensor. The controller 52 controls the motor 48 in accordance with the output of the torque sensor.

As shown in FIG. 4, the housing 42 is configured to be at least partially accommodated in the frame 22. More specifically, the housing 42 is configured so that at least part of the first accommodation portion 56 is accommodated in the part of the component mounting portion 22D at the side connected to the down tube 22C and so that the second accommodation portion 58 is accommodated in the part of the component mounting portion 22D at the side connected to the seat tube 22E and the chain stay 22G. Preferably, the housing 42 is mounted on the frame 22 with a direction parallel to so that the rotation axis of the motor 48 extends in the longitudinal direction of the down tube 22C. In this way, a direction parallel to the rotation axis of the motor 48 and a direction parallel to the rotation axis of the crankshaft 32A are orthogonal to each other, and the rotation axis of the motor 48 extends in the longitudinal direction of the down tube 22C. The part of the component mounting portion 22D accommodating the first accommodation portion 56 can be included in the down tube 22C.

As shown in FIGS. 4 and 7, the first mounting portion 44 includes a first member 68 and a second member 70. The first mounting portion 44 is provided on the housing 42 independently from the support 54. The first mounting portion 44 and the second mounting portion 46 are spaced apart from each other in a predetermined direction. The predetermined direction is parallel to the axial direction C of the crankshaft 32A. The first mounting portion 44 is provided on a first side surface 42X of the housing 42 in the axial direction C of the crankshaft 32A. The second mounting portion 46 is provided on a second side surface 42Y of the housing 42 at the opposite side of the first side surface 42X in the axial direction C of the crankshaft 32A. The first side surface 42X includes one of the side surfaces of the second accommodation portion 58 in the axial direction C of the crankshaft 32A. The second side surface 42Y includes the other one of the side surfaces of the second accommodation portion 58 in the axial direction C of the crankshaft 32A.

The first member 68 is ring-shaped. Further, the first member 68 includes a first hole 68A extending in a first direction. The first hole 68A includes a through hole through which the crankshaft 32A extends. The first member 68 includes a through hole. The first direction coincides with the axial direction C of the crankshaft 32A. The first member 68 includes a male thread 68B. The male thread 68B is formed on the outer circumferential portion of the first member 68. The first member 68 is configured to support the housing 42 in a direction intersecting the first direction and the axial direction C of the crankshaft 32A. The housing 42 includes an insertion portion 42A inserted into the first hole 68A of the first member 68. Preferably, the insertion portion 42A is included in the support 54. The first member 68 includes an inner circumferential portion 68D that supports the insertion portion 42A. Preferably, the part of the first member 68 into which the insertion portion 42A is inserted has an inner diameter that is slightly larger than the outer diameter of the insertion portion 42A.

Figure 8:
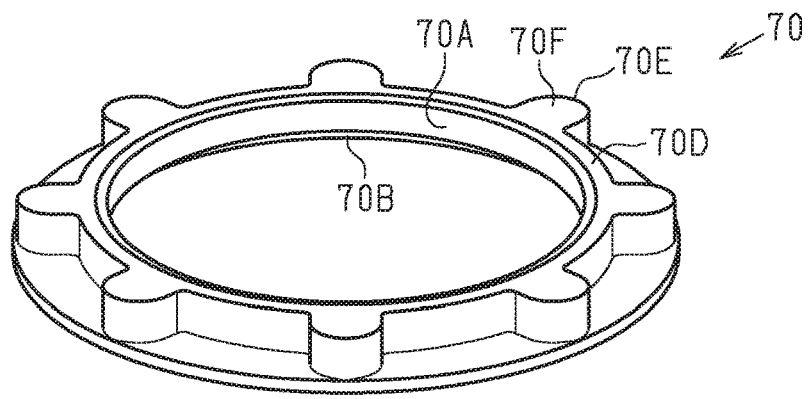
FIG. 8 is a perspective view of a second member of the bicycle component illustrated in FIG. 7.

The second member 70 is ring-shaped. At least part of the second member 70 is provided between the housing 42 and the frame 22. At least part of the second member 70 is provided between the first member 68 and the frame 22. The second member 70 is configured to contact part of the frame 22 in a direction intersecting the first direction and the axial direction C of the crankshaft 32A. The second member 70 contacts the second side wall 23E of the component mounting portion 22D. The second member 70 includes a hole 70A extending in the first direction. Further, the second member 70 includes a female thread 70B joined with the male thread 68B of the first member 68. The female thread 70B is formed on the inner circumferential portion of the second member 70. As shown in FIG. 8, the second member 70 includes a side surface 70D that defines a frame engagement portion 70E. The frame engagement portion 70E includes a plurality of projections 70F projecting in the axial direction of the crankshaft 32A. The projections 70F are arranged in intervals in the circumferential direction of the crankshaft 32A. The frame 22 includes a plurality of recesses 22X corresponding to the projections 70F of the frame engagement portion 70E. The projections 70F of the frame engagement portion 70E are fitted into the recesses 22X of the frame 22 to restrict rotation of the second member 70 about its center axis relative to the frame 22. The ends of the projections 70F can be linked in a ring-shaped manner at the inner circumferential side of the second member 70.

The first member 68 is configured to press the housing 42. More specifically, the first member 68 is configured to be coupled with the second member 70. The first member 68 has a first end surface 68C that presses the housing 42 in the first direction under the force of the second member 70. The second member 70 is configured to press the frame 22. More specifically, the parts in the side surface 70D of the second member 70 between the projections 70F are configured to contact the part of the frame 22 faced toward the second side surface 42Y of the housing 42.

At least one of the first member 68 or the second member 70 includes a tool engagement portion 72 that is engageable with a tool. Preferably, the tool engagement portion 72 is defined by at least one of the inner circumferential portion 68D or an outer circumferential portion 68E of the first member 68. In the present embodiment, the tool engagement portion 72 is defined by the inner circumferential portion 68D of the first member 68. The tool engagement portion 72 includes a plurality of recesses and a plurality of projections. The projections project in the radial direction of the crankshaft 32A. The projections and the recesses are alternatively arranged at predetermined intervals in the circumferential direction around the crankshaft 32A. The projections and the recesses are formed in the inner circumferential portion 68D of the first member 68.

As shown in FIGS. 5 and 7, the second mounting portion 46 includes a threaded hole 42B and a first coupling member 74. The threaded hole 42B is formed in the housing 42. The first coupling member 74 is ring-shaped. The first coupling member 74 includes a hole 74A extending in the first direction. The first coupling member 74 is extended through the frame 22 and coupled to the threaded hole 42B. The first coupling member 74 extends through the first side wall 23D of the component mounting portion 22D. The threaded hole 42B includes a female thread. The first coupling member 74 includes a male thread 74B joined with the female thread of the threaded hole 42B. The outer circumferential portion of the first coupling member 74 includes a part where the male thread 74B is formed and a side wall 74C extending outward in the radial direction from the part where the male thread 74B is formed. The first coupling member 74 corresponds to a coupling member that is extended through the frame 22 and coupled to the threaded hole 42B. The side wall 74C is configured to sandwich the frame 22 with the housing 42. Preferably, at least one of the outer circumferential portion and the inner circumferential portion of the side wall 74C defines a tool engagement portion that is engageable with a tool. The tool engagement portion includes, for example, a plurality of recesses and a plurality of projections shaped to be recessed or projected in the radial direction of the first coupling member 74. The threaded hole 42B can include a male thread instead of a female thread. In this case, the male thread on the outer circumferential portion of the first coupling member 74 is omitted, and a female thread joined with the threaded hole 42B is formed in the inner circumferential portion of the first coupling member 74.

Figure 6:
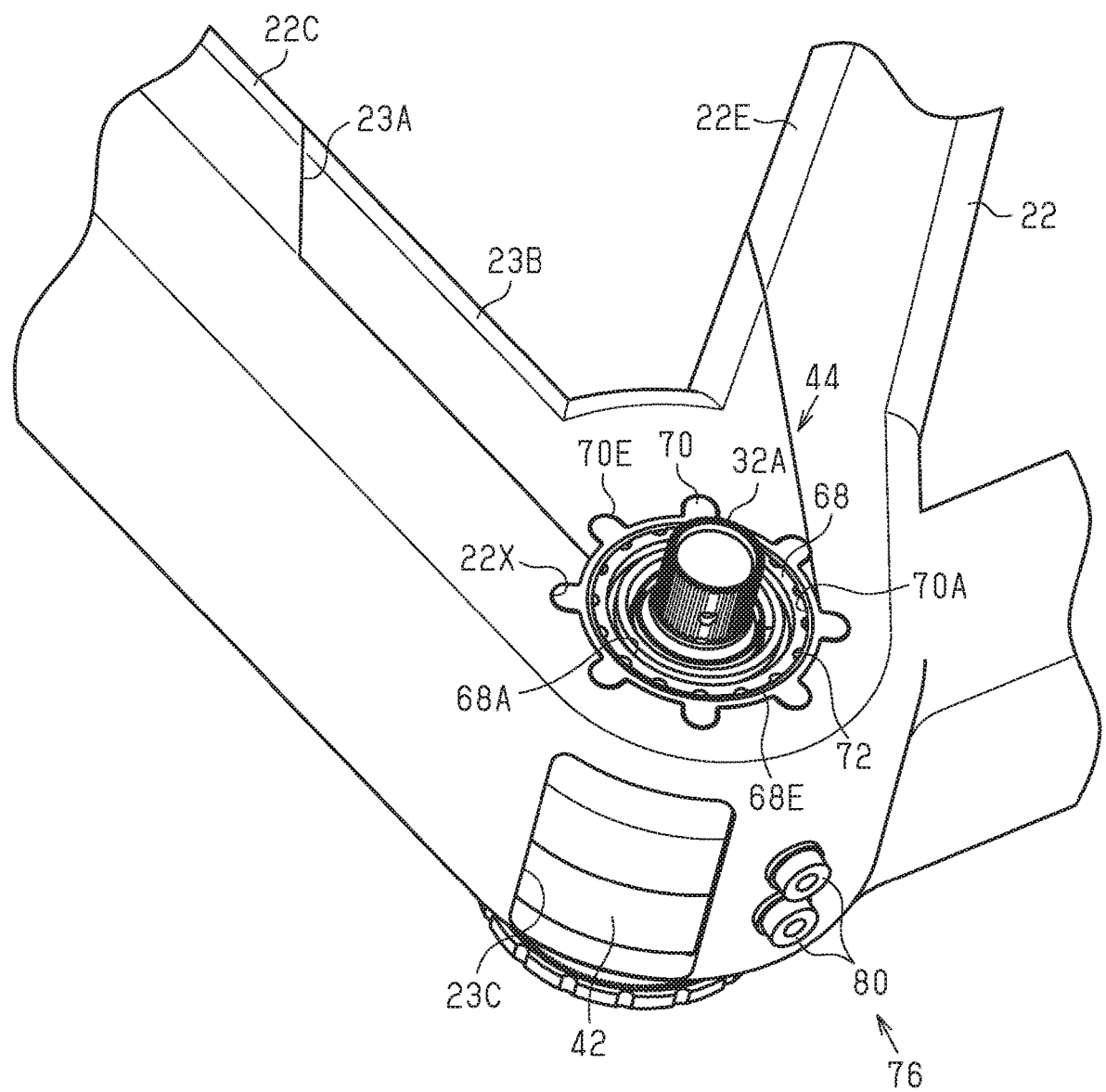
FIG. 6 is a perspective view of the portion in the vicinity of the crankshaft of the bicycle illustrated in FIG. 2.

Preferably, the bicycle component 40 further includes a third mounting portion 76 that is configured to mount the housing 42 on the frame 22. As shown in FIG. 6, the third mounting portion 76 is provided on the housing 42 in a direction intersecting the axial direction of the crankshaft 32A. The third mounting portion 76 includes threaded holes 78 and second coupling members 80. The threaded holes 78 are formed in the housing 42. The second coupling members 80 are extended through the frame 22 and coupled to the threaded holes 78. The second coupling members 80 include bolts. The second coupling members 80 can be configured including a plurality of threaded holes and a plurality of bolts. Preferably, in this case, the threaded holes are located at intervals in the axial direction of the crankshaft 32A.

Figure 9:
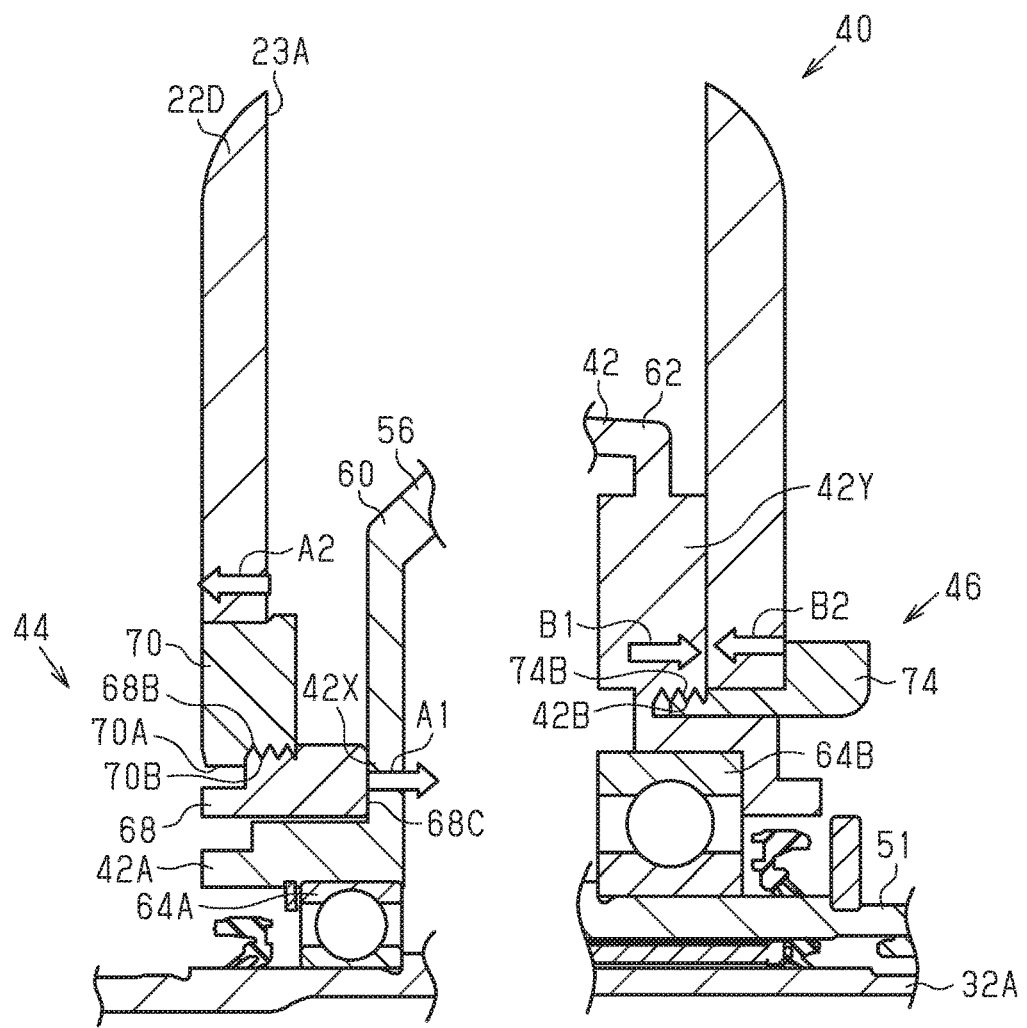
FIG. 9 is a partially enlarged cross-sectional view of the portion in the vicinity of the crankshaft of the bicycle illustrated in FIG. 7.

As shown in FIG. 9, the first mounting portion 44 is configured to apply force to the housing 42 and the frame 22 acting to move the housing 42 and the frame 22 away from each other. The first mounting portion 44 is configured to apply force to the housing 42 and the frame 22 acting to move the housing 42 and the frame 22 away from each other in the axial direction C of the crankshaft 32A. More specifically, the first member 68 presses the housing 42 with the first end surface 68C to apply force to the housing 42 acting toward the second mounting portion 46 in direction A1. The second member 70 applies force with the axial force of the second member 70 to the frame 22 acting in direction A2, which is opposite to direction A1.

The second mounting portion 46 is configured to apply force to the housing 42 and the frame 22 acting to move the housing 42 and the frame 22 toward each other. The second mounting portion 46 is configured to apply force to the housing 42 and the frame 22 acting to move the housing 42 and the frame 22 toward each other in the axial direction C of the crankshaft 32A. More specifically, the first coupling member 74 applies force with the axial force of the first coupling member 74 to the housing 42 acting in direction B1 toward the frame 22. The first coupling member 74 applies force with the first coupling member 74 to the frame 22 acting in direction B2, which is opposite to direction B2.

In the housing 42, the first housing 60 is pressed toward the second housing 62. This restricts separation of the portions joining the first housing 60 and the second housing 62. Thus, deformation and the formation of a gap are limited in the housing 42.

Second Embodiment

A bicycle component 40 in accordance with a second embodiment will now be described with reference to FIG. 10. The bicycle component 40 in accordance with the second embodiment differs from the bicycle component 40 in accordance with the first embodiment only in the position where the bicycle component 40 is mounted on the frame 22. Otherwise, the bicycle component 40 in accordance with the second embodiment is the same as the bicycle component 40 in accordance with the first embodiment. Thus, same reference numerals are given to those components that are the same as the corresponding components of the first embodiment. Such components will not be described in detail. In the present embodiment, at least part of the first accommodation portion 56 of the housing 42 is accommodated in the seat tube 22E.

Figure 10:
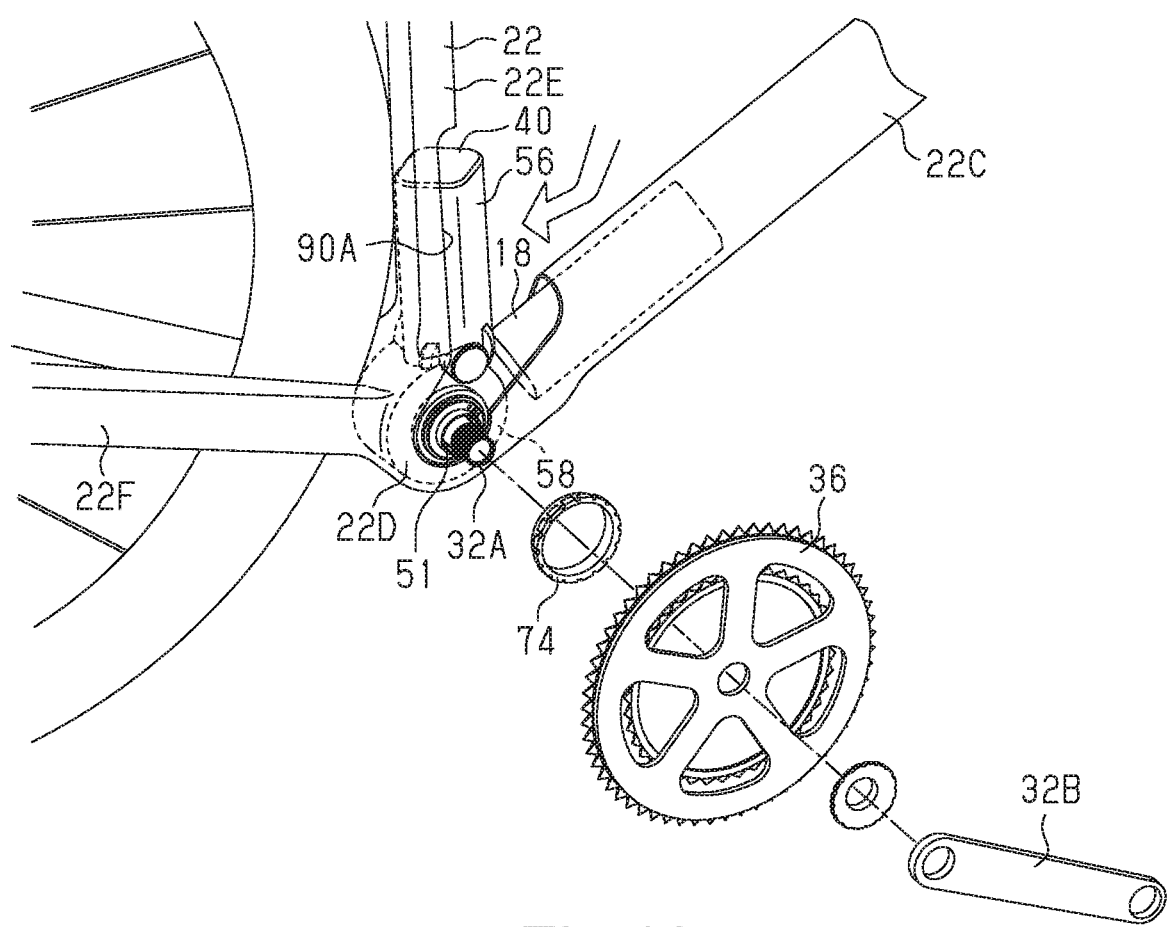
FIG. 10 is a perspective view of a portion in the vicinity of a crankshaft in a bicycle including a bicycle component in accordance with a second embodiment.

As shown in FIG. 10, the first accommodation portion 56 of the housing 42 is accommodated in at least part of the seat tube 22E, and the second accommodation portion 58 of the housing 42 is accommodated in the component mounting portion 22D. The frame 22 includes a first open portion 90A to accommodate the bicycle component 40 in the frame 22. The first open portion 90A is provided over the component mounting portion 22D, the portion of the seat tube 22E connected to the component mounting portion 22D, and the portion of the down tube 22C connected to the component mounting portion 22D. The first open portion 90A is open toward the front and upper sides of the bicycle 10. Preferably, a cover (not shown) is attached to the first open portion 90A. The cover closes the opening of the first open portion 90A.

At least part of the bicycle component 40 is arranged inside the frame 22. At least part of the bicycle component 40 in accordance with the present embodiment is arranged inside the seat tube 22E. More specifically, part of the first accommodation portion 56 is accommodated in the seat tube 22E, and the second accommodation portion 58 is accommodated in the component mounting portion 22D. Preferably, the outer circumference of the second accommodation portion 58 is provided with an electric terminal connected to the controller 52 (refer to FIG. 3). The electric terminal on the outer circumference of the second accommodation portion 58 is connected to the battery 18, which is located inside the down tube 22C. The housing 42 is mounted on the frame 22 so that the rotation axis of the motor 48 substantially extends in the longitudinal direction of the seat tube 22E.

Third Embodiment

A bicycle component 92 in accordance with a third embodiment will now be described with reference to FIGS. 11 and 12. The bicycle component 92 in accordance with the third embodiment differs from the bicycle component 40 in accordance with the first embodiment only in that the bicycle component 92 is provided outside the frame 22. Otherwise, the bicycle component 92 in accordance with the third embodiment is the same as the bicycle component 40 in accordance with the first embodiment. Thus, same reference numerals are given to those components that are the same as the corresponding components of the first embodiment. Such components will not be described in detail.

Figure 11:
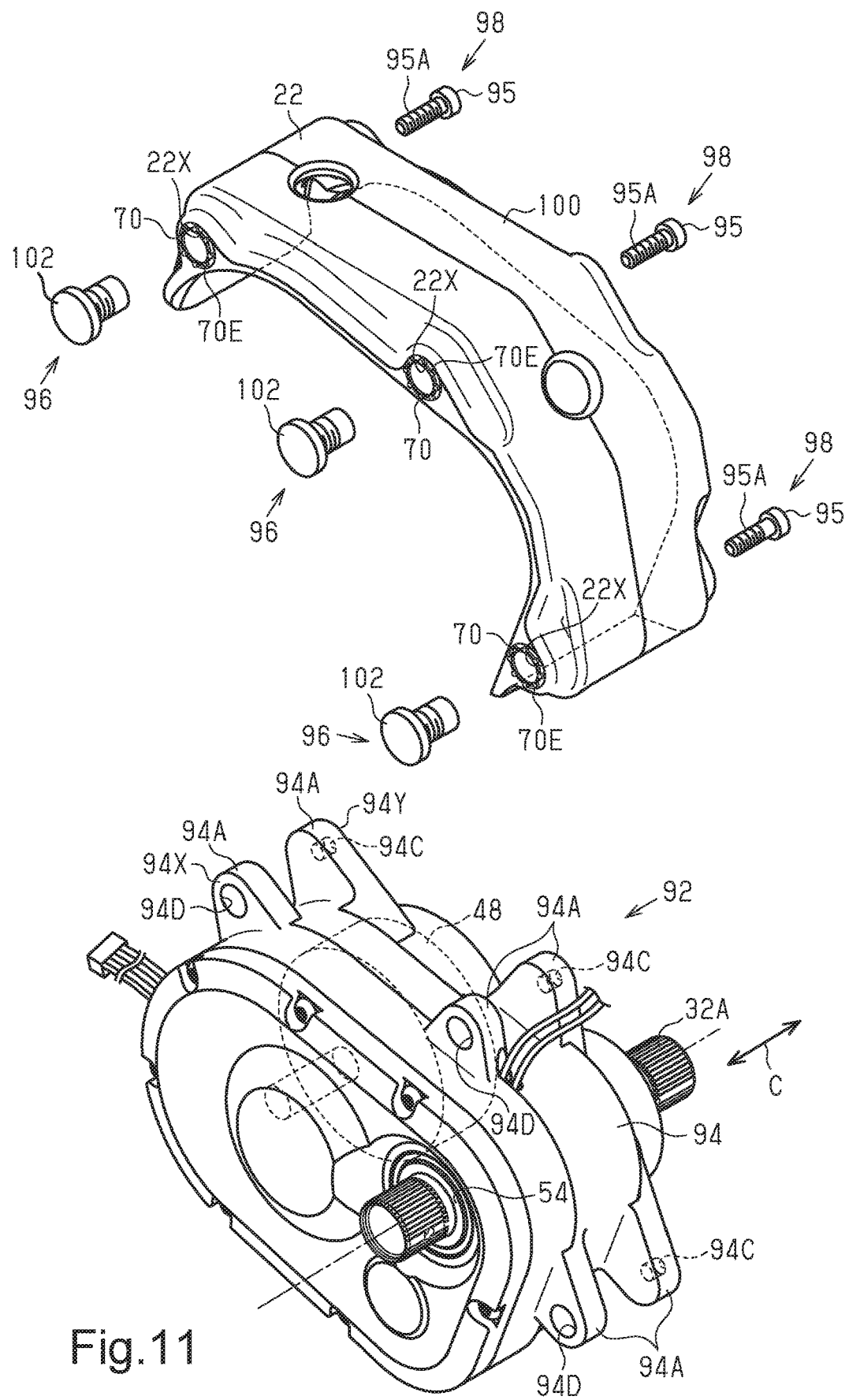
FIG. 11 is an exploded perspective view of a bicycle component in accordance with a third embodiment and a bracket.

As shown in FIG. 11, the frame 22 is provided with a bracket 100 for mounting the bicycle component 92. The bracket 100 is connected to the frame 22 at the lower end of the down tube 22C, the lower end of the seat tube 22E and the front end of the chain stay 22G.

At least part of the bicycle component 92 is arranged in the frame 22. A part of the bicycle component 92 in accordance with the present embodiment is arranged inside the bracket 100.

The bicycle component 92 includes a housing 94 and a plurality of first mounting portions 96 that are configured to mount the housing 94 on the bicycle 10. The bicycle component 92 further includes a plurality of second mounting portions 98 that are configured to mount the housing 94 on the frame 22 of the bicycle 10. The housing 94 supports the crankshaft 32A of the bicycle 10. The housing 94 includes the support 54 that supports the crankshaft 32A. The housing 94 accommodates at least a part of the motor 48.

The motor 48 is provided in the housing 94. The housing 94 is configured so that at least a part of the housing 94 is accommodated in the frame 22. The bicycle component 92 includes a motor 48, a reduction gear (not shown) and a controller (not shown). In one example, the axial direction of the output shaft of the motor 48 is parallel to the axial direction C of the crankshaft 32A. The reduction gear reduces the speed of the rotation of the motor 48 and outputs the rotation. The reduction gear includes, for example, a gear mechanism. The reduction gear outputs the rotation of the motor 48 to the output portion arranged around the crankshaft 32A. The rotation of the motor 48 is transmitted to the front rotation body 36 (refer to FIG. 1) by the reduction gear and the output portion.

The housing 94 is configured so that at least a part of the housing is accommodated in the frame 22. More specifically, the housing 94 includes at least one projection 94A projecting from the outer circumferential portion of the housing 94 and fitted to the bracket 100. Preferably, the housing 94 includes a plurality of the projections 94A. Preferably, the first mounting portions 96 and the second mounting portions 98 are selectively provided with the projections 94A.

The first mounting portions 96 each include a first member 102 and a second member 70. The first mounting portion 96 is provided on the housing 94 independently from the support 54 (refer to FIG. 11). The first mounting portions 96 are provided on a first side surface 94X of the housing 94 with respect to the axial direction C of the crankshaft 32A. The first mounting portions 96 are spaced apart from the second mounting portions 98 in a predetermined direction. The predetermined direction is parallel to the axial direction C of the crankshaft 32A. The first mounting portions 96 are provided in the first side surface 94X of the housing 94 with respect to the axial direction C of the crankshaft 32A or in the outer circumferential portion of the housing 94 around the axial direction C of the crankshaft 32A at portions closer to the first side surface 94X than the second mounting portions 98. The second mounting portions 98 are provided in the second side surface 94Y at the side opposite to the first side surface 94X of the housing 94 or in the outer circumferential portion around the axial direction C of the crankshaft 32A at portions closer, in the axial direction C of the crankshaft 32A, to the second side surface 94Y than the first mounting portions 96.

Figure 12:
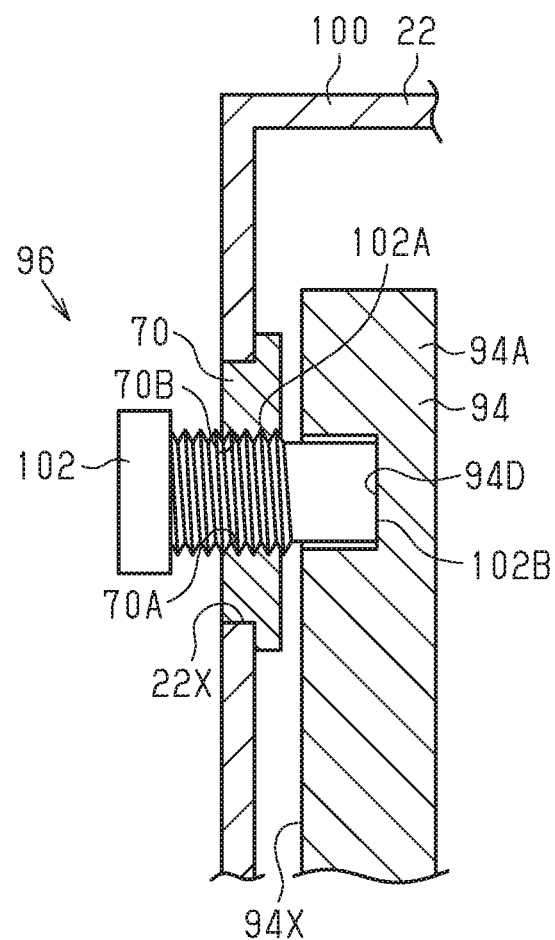
FIG. 12 is a partially cross-sectional view of a portion of the bicycle component in accordance with the third embodiment.

As shown in FIG. 12, the first member 102 is a bolt. The first member 102 includes a male thread 102A. Preferably, the first member 102 is configured to support the housing 94 in a direction intersecting the first direction and the axial direction C of the crankshaft 32A. The first member 102 does not have to support the housing 94 in a direction intersecting the first direction and the axial direction C of the crankshaft 32A. The housing 94 includes a second hole 94D extending in the first direction. The second hole 94D is formed in the first mounting portion 96. One end of the first member 102 in the first direction is inserted into the second hole 94D. The male thread 102A of the first member 102 is joined with a female thread 70B of the second member 70.

The first member 102 is configured to press the housing 94. Specifically, the first member 102 is configured so that a first end surface 102B in the first direction joined with the second member 70 presses the housing 94. The second member 70 is configured to press the frame 22. Specifically, a portion between the projections 70F (refer to FIG. 8) of the second member 70 is configured to contact the portion of the frame 22 faced toward the first mounting portion.

Each second mounting portion 98 includes a threaded hole 94C, which is formed in the housing 94, and a first coupling member 95. The first coupling member 95 is a bolt. The first coupling member 95 is inserted through the frame 22 and coupled to the threaded hole 94C. The first coupling member 95 includes a male thread 95A joined with the female thread of the threaded hole 94C.

Fourth Embodiment

A bicycle component 110 in accordance with a fourth embodiment will now be described with reference to FIGS. 13 to 21. The bicycle component 110 in accordance with the fourth embodiment differs from the bicycle component 40 in accordance with the first embodiment only in the construction of a housing 112 and a mounting structure 130. Otherwise, the bicycle component 110 in accordance with the fourth embodiment is the same as the bicycle component 40 in accordance with the first embodiment. Thus, same reference numerals are given to those components that are the same as the corresponding components of the first embodiment. Such components will not be described in detail. The bicycle component 110 in accordance with the present embodiment is a bicycle drive unit.

Figure 13:
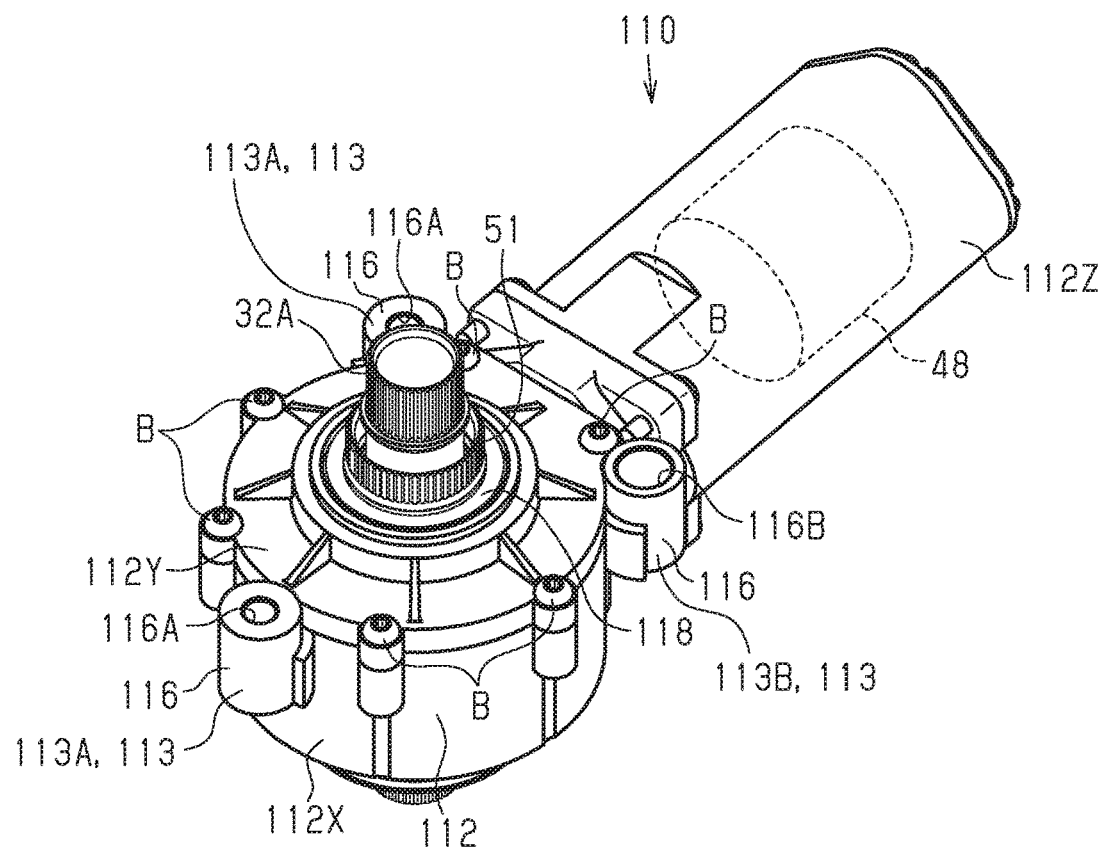
FIG. 13 is a first perspective view of a bicycle component in accordance with a fourth embodiment.
Figure 14:
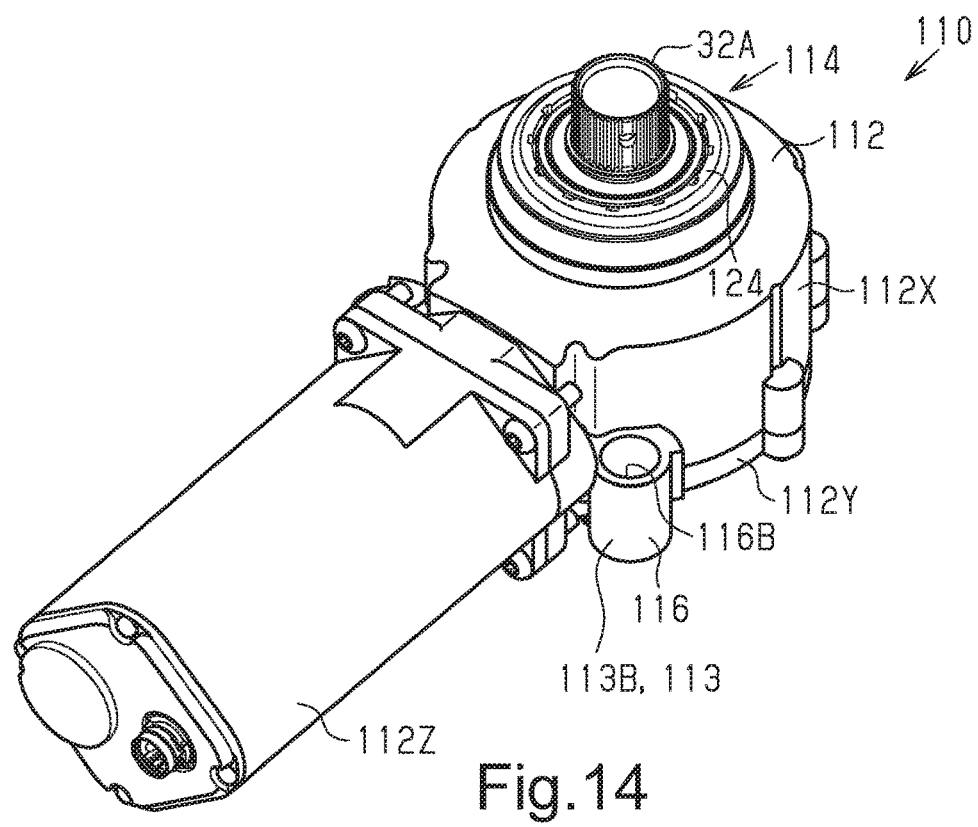
FIG. 14 is a second perspective view of the bicycle component illustrated in FIG. 13.

As shown in FIGS. 13 and 14, the bicycle component 110 includes a housing 112 and a first mounting portion 114. The first mounting portion 114 is configured to mount the housing 112 on the bicycle 10. The bicycle component 110 further includes a plurality of second mounting portions 116 that is configured to mount the housing 112 on the frame 132 of the bicycle 10. The housing 112 supports the crankshaft 32A of the bicycle 10. The housing 112 includes a support portion 118 that supports the crankshaft 32A. The housing 112 accommodates at least part of the motor 48. The housing 112 includes a first housing 112X and a second housing 112Y. The first housing 112X includes a first side surface in the axial direction C of the crankshaft 32A. The second housing 112Y includes a second side surface at the side opposite to the first side surface of the housing 112 in the axial direction C of the crankshaft 32A. The first housing 112X and the second housing 112Y are coupled to each other by a plurality of bolts B. The housing 112 further includes a third housing 112Z. The third housing 112Z is connected to the circumferential portion of the first housing 112X by a plurality of bolts in a direction perpendicular to the axial direction C of the crankshaft 32A. A motor 48 is accommodated in the third housing 112Z.

The motor 48 is provided in the housing 112. The housing 112 is configured so that at least part of the motor 48 is accommodated in the frame 132. The bicycle component 110 includes a motor 48, a reduction gear (not shown) and a controller (not shown). The housing 112 of the bicycle component 110 accommodates components similar to the bicycle component 40 of the first embodiment in a similar arrangement.

Figure 15:
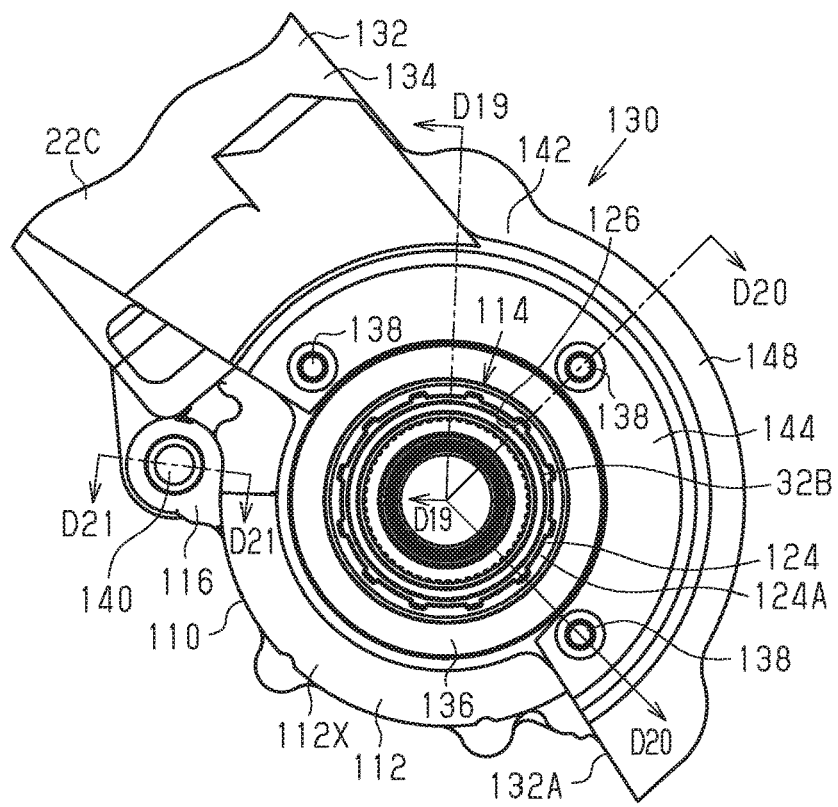
FIG. 15 is a left side elevational view of the bicycle component illustrated in FIG. 13 in a state mounted on the frame.
Figure 16:
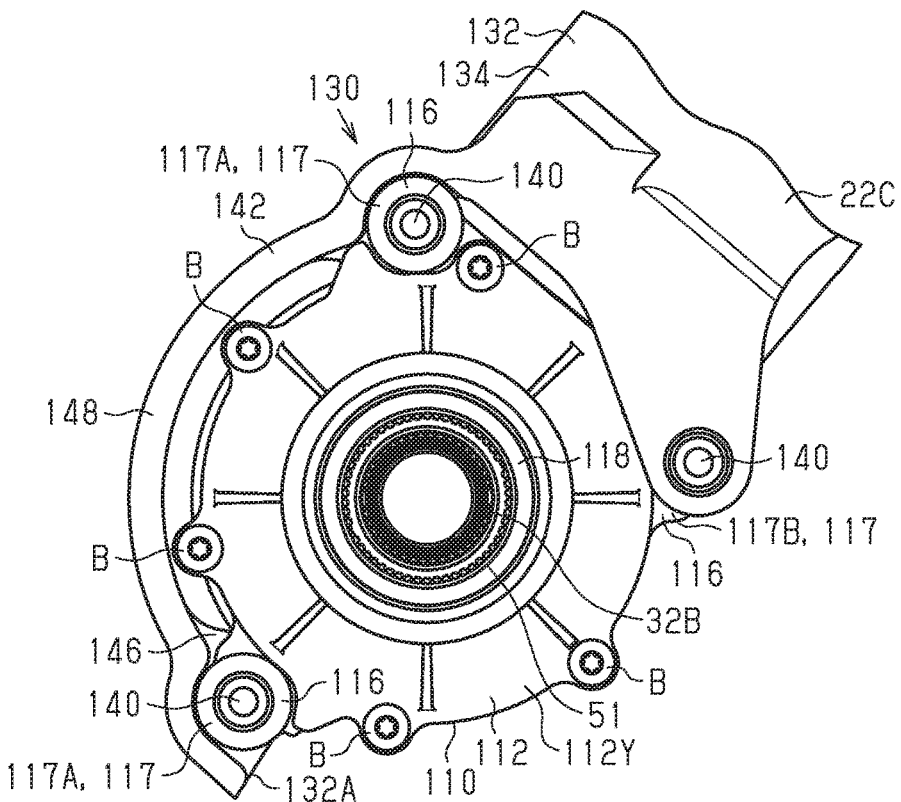
FIG. 16 is a right side elevational view of the bicycle component illustrated in FIG. 13 in a state mounted on the frame.
Figure 17:
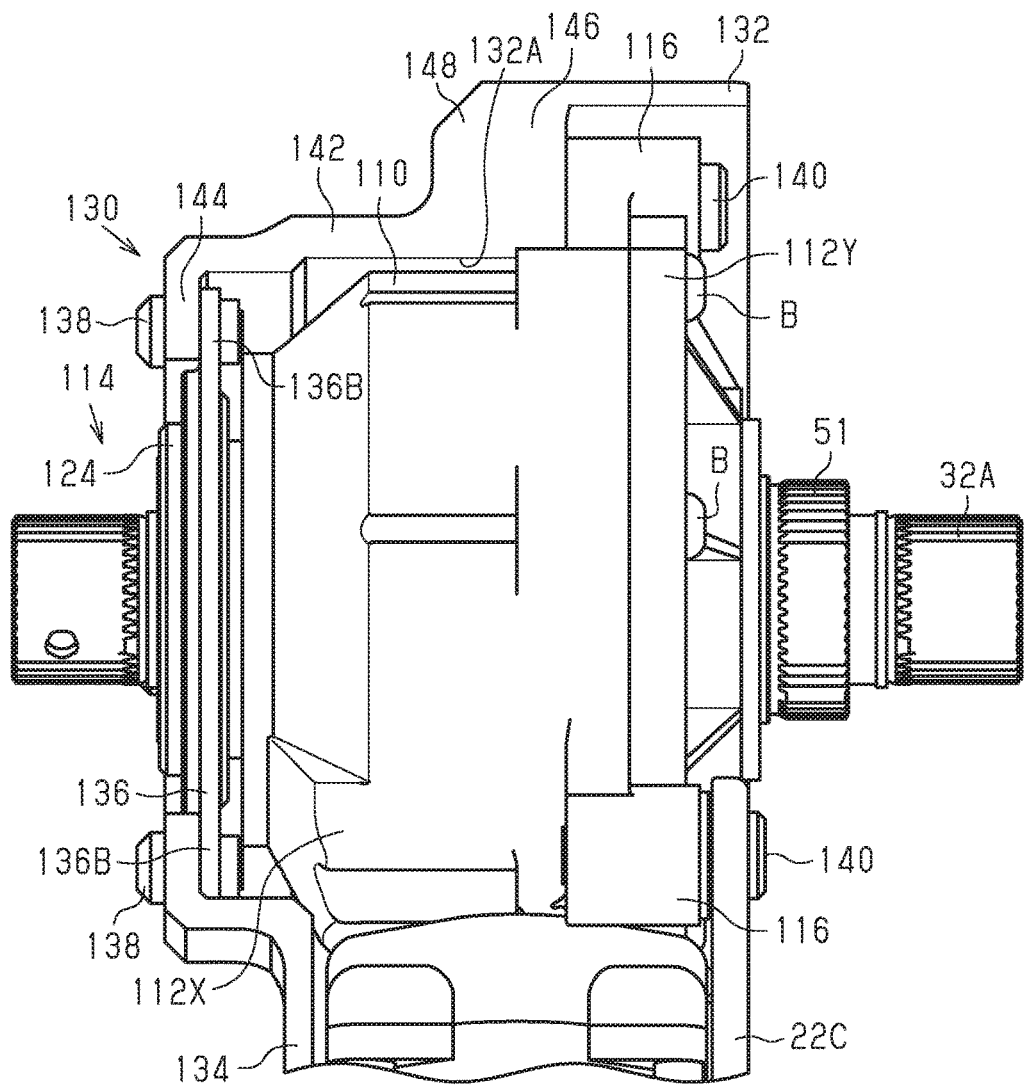
FIG. 17 is a bottom plan view of the bicycle component illustrated in FIG. 13 in a state mounted on the frame.

As shown in FIGS. 15 to 17, the mounting structure 130 of the bicycle component 110 includes the first mounting portion 114 and a frame 132. The mounting structure 130 further includes the second mounting portions 116. The frame 132 includes a frame main body 134 and a mounting member 136 that is separate from the frame main body 134. The mounting structure 130 further includes a plurality of bolts 138 to couple the mounting member 136 to the frame main body 134. The mounting structure 130 further includes a plurality of first coupling members 140 that are configured to mount the second mounting portions 116 on the frame 132. The mounting member 136 is a bracket.

The frame main body 134 includes a head tube 22A, a top tube 22B, a down tube 22C, a seat tube 22E, a seat stay 22F and a chain stay 22G that are shown in FIG. 1 and a component mounting portion 142 that is shown in FIGS. 15 to 17. FIGS. 15 to 17 do not show the seat tube 22E and the chain stay 22G. The component mounting portion 142 is connected to the frame 132 at the lower end of the down tube 22C, the lower end of the seat tube 22E, and the front end of the chain stay 22G. The component mounting portion 142 is configured to accommodate at least part of the bicycle component 110. Preferably, the component mounting portion 142 is formed integrally with the down tube 22C, the seat tube 22E, and the chain stay 22G but can be connected through welding, adhesion or the like. The frame 132 is provided with a first open portion 132A to accommodate the bicycle component 110 and the battery 18 (refer to FIG. 2) in the frame 132. The first open portion 132A opens toward the lower part of the bicycle 10. The first open portion 132A is provided over the component mounting portion 142 and the portion of the down tube 22C connected to the component mounting portion 22D. The component mounting portion 142 includes a first side wall 144, a second side wall 146 and an upper wall 148. The first side wall 144 is located at the left side of the bicycle 10. The second side wall 146 is located at the right side of the bicycle 10. The upper wall 148 is located toward the upper side of the bicycle 10. The first side wall 144 and the second side wall 146 are connected to the down tube 22C, the seat tube 22E and the chain stay 22G. Preferably, the first side wall 144 and the second side wall 146 are substantially arcuate or sectoral in shape as viewed in the axial direction of the crankshaft 32A. When viewing the first side wall 144 and the second side wall 146 in the axial direction of the crankshaft 32A, the opening of the second side wall 146 is larger than the opening of the first side wall 144. The upper wall 148 is connected to the upper ends of the first side wall 144 and the second side wall 146. Further, the upper wall 148 is connected to the down tube 22C, the seat tube 22E, and the chain stay 22G. The of the first open portion 132A includes an opening extending in the first side wall 144 and the second side wall 146 of the component mounting portion 142 is provided is formed to extending from where the crankshaft 32A is located toward the rear of the bicycle 10. Preferably, a cover is attached to the first open portion 132A. The cover closes the opening of the first open portion 132A. The cover is attachable to and detachable from the frame 132 or attachable to and detachable from the bicycle component 110. The bicycle component 110 is inserted into the opening of the first open portion 132A from the lower side and mounted on the frame 132.

Figure 18:
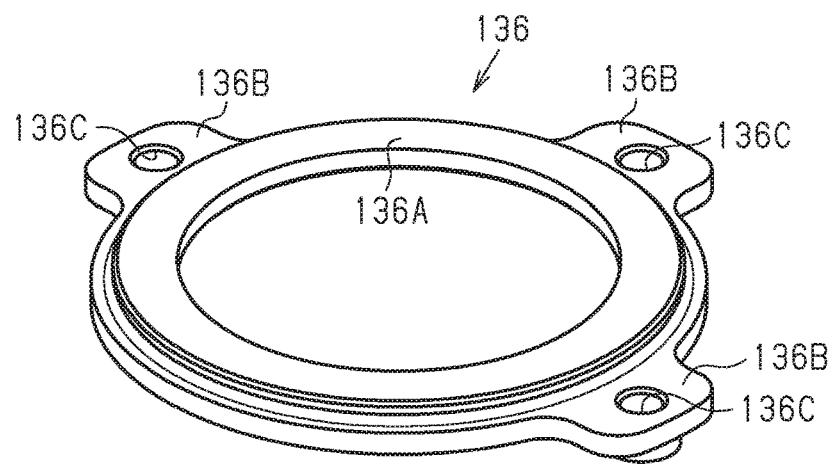
FIG. 18 is a perspective view of the mounting member of the bicycle component illustrated in FIG. 17.
Figure 20:
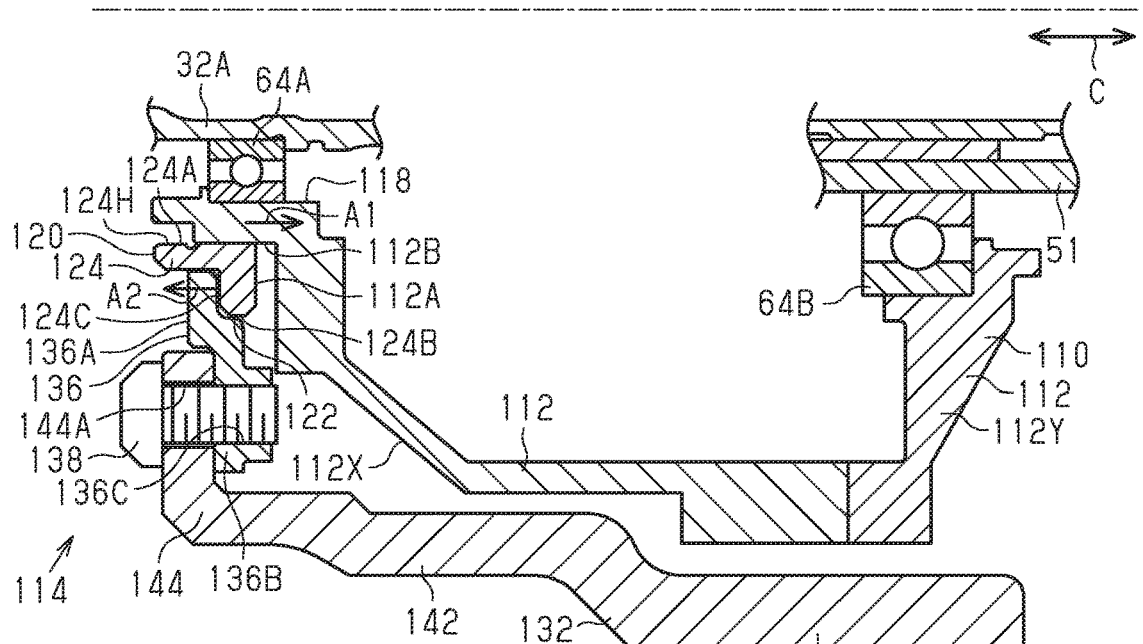
FIG. 20 is a cross-sectional view of a portion of the bicycle component illustrated in FIGS. 13 to 18 as seen along section along line D20-D20 in FIG. 15.

As shown in FIGS. 15 and 18, the mounting member 136 is annular. The mounting member 136 includes an inner circumferential portion 136A and an outer circumferential portion 136B. The inner circumferential portion 136A is ring-shaped. The outer circumferential portion 136B projects outward in the radial direction from the inner circumferential portion 136A. A plurality of outer circumferential portions 136B is provided. The outer circumferential portions 136B are non-continuous in the circumferential direction. The outer circumferential portions 136B can be continuous in the circumferential direction. Each outer circumferential portion 136B includes a female thread 136C. In the present embodiment, the mounting member 136 is provided with three outer circumferential portions 136B. The outer circumferential portions 136B are provided at intervals of a predetermined angle around the rotation axis of the crankshaft 32A. The predetermined angle is preferably greater than or equal to 30 degrees and less than or equal to 80 degrees. As shown in FIGS. 17 and 20, the outer circumferential portion 136B of the mounting member 136 is coupled to the frame main body 134. The bolts 138 are extended through holes 144A in the frame main body 134 from the side of the frame main body 134 opposite to the housing 112. The mounting member 136 is coupled to the first side wall 144 of the frame main body 134 by the bolts 138. The outer circumferential portions 136B are located between the frame main body 134 and the first side wall 144 of the housing 112. In a state in which the outer circumferential portions 136B of the mounting member 136 are located on the surface of the first side wall 144 at the side of the housing 112, the bolts 138 are extended through the holes 144A in the first side wall 144 from the side opposite to the housing 112 and joined with the female threads 136C. Preferably, the outer circumferential portions 136B of the mounting member 136 are offset from the inner circumferential portion 136A in the axial direction C of the crankshaft 32A. Preferably, at least part of each inner circumferential portion 136A of the mounting member 136 is provided at a position overlapping the first side wall 144 in the axial direction C of the crankshaft 32A. The first side wall 144 is sandwiched between the bolt heads of the bolts 138 and the outer circumferential portions 136B. The holes 144A of the first side wall 144 can be changed to threaded holes and the female threads 136C of the outer circumferential portions 136B can be changed to through holes to sandwich the outer circumferential portions 136B between the bolt heads of the bolts 138 and the first side wall 144. In this case, the outer circumferential portion 136B of the mounting member 136 can be located on the surface of the first side wall 144 at the side of the housing 112 or can be located on the surface of the first side wall 144 at the side opposite to the housing 112.

Figure 19:
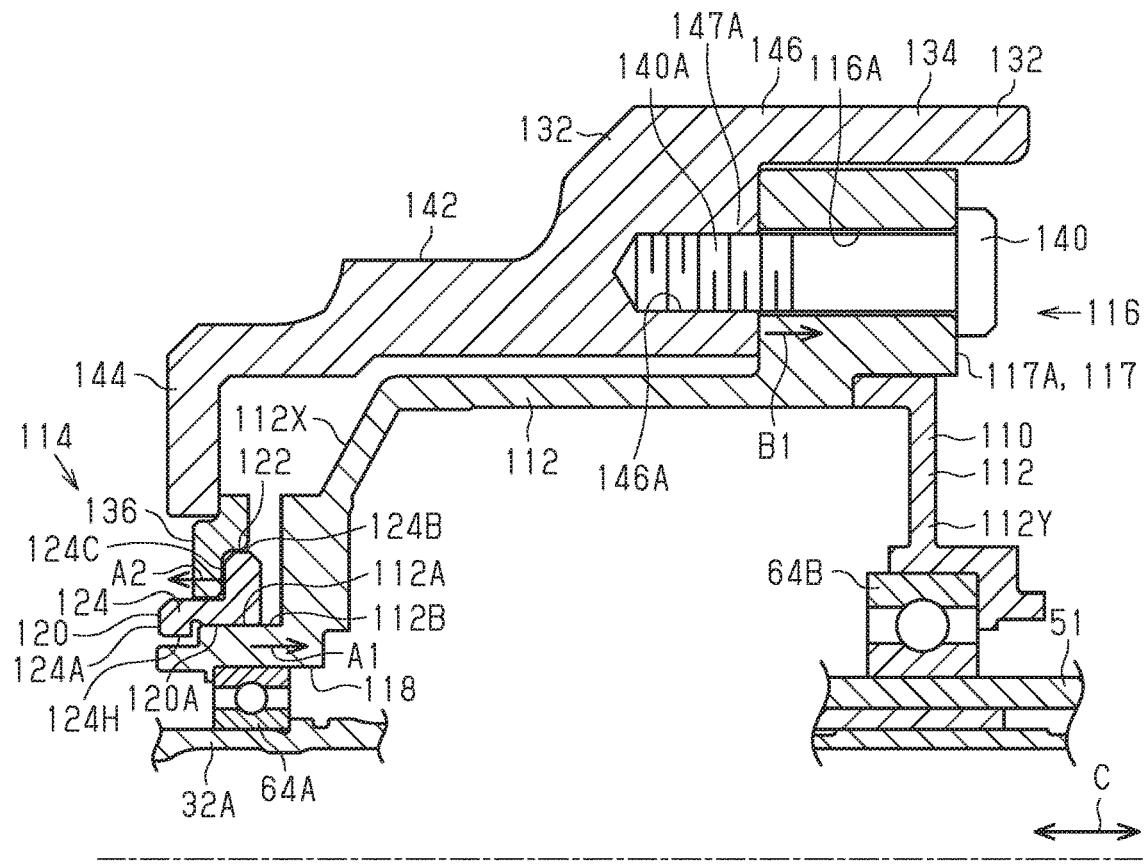
FIG. 19 is a cross-sectional view of a portion of the bicycle component illustrated in FIGS. 13 to 18 as seen along section line D19-D19 in FIG. 15.

As shown in FIGS. 19 and 20, the first mounting portion 114 includes a first part 120 and a second part 122. The first mounting portion 114 is provided on the housing 112 independently from the support 118. The first mounting portion 114 is spaced apart from the second mounting portions 116 in a predetermined direction. The predetermined direction is parallel to the axial direction C of the crankshaft 32A. The first mounting portion 114 is provided on the first housing 112X. The second mounting portions 116 are provided on the first housing 112X. The second mounting portions 116 can be provided on the second housing 112Y.

The first part 120 is coupled to the housing 112. The first mounting portion 114 includes an annular member 124. The annular member 124 is ring-shaped. The annular member 124 has the same structure as the first member 68 of the first embodiment. The annular member 124 includes an inner circumferential portion 124A and an outer circumferential portion 124B. The first part 120 is defined by the inner circumferential portion 124A. The second part 122 is defined by the outer circumferential portion 124B. The second part 122 is configured to press the frame 132 away from the housing 112. More specifically, the second part 122 presses the mounting member 136 away from the housing 112. The annular member 124 includes a first hole 124H extending in the first direction. The first hole 124H includes a through hole through which the crankshaft 32A extends. The first direction coincides with the axial direction C of the crankshaft 32A. The annular member 124 is configured to be supported by the housing 112 in a direction intersecting the first direction and the axial direction C of the crankshaft 32A. Part of the housing 112 is inserted into the first hole 124H of the annular member 124. The housing 112 includes an insertion portion 112B that is inserted into the first hole 124H of the annular member 124. Preferably, the insertion portion 112B is included in the support 118. The inner circumferential portion 124A of the annular member 124 is supported by the insertion portion 112B of the housing 112.

The annular member 124 is configured to press the housing 112. More specifically, the annular member 124 is configured so that the inner circumferential portion 124A presses the housing 112. The annular member 124 is configured so that a first end surface 124C of the outer circumferential portion 124B in the first direction presses the mounting member 136 of the frame 132 in a direction opposite to the direction in which the inner circumferential portion 124A presses the housing 112.

The housing 112 includes a first threaded portion 112A. The first threaded portion 112A of the housing 112 is formed to surround the outer circumferential surface of the crankshaft 32A about the rotation axis of the crankshaft 32A. The insertion portion 112B is defined by a portion of the housing 112 from which one end of the crankshaft 32A in the axial direction C projects. The insertion portion 112B is annular. The insertion portion 112B has an inner diameter in a direction perpendicular to the axial direction C of the crankshaft 32A that is larger than the outer diameter of the crankshaft 32A in the direction perpendicular to the axial direction C of the crankshaft 32A. The inner circumference of the insertion portion 112B is spaced apart from the crankshaft 32A. The first threaded portion 112A is provided on the insertion portion 112B. The first threaded portion 112A is provided on the outer circumference of the insertion portion 112B in a direction perpendicular to the axial direction C of the crankshaft 32A. The first part 120 of the first mounting portion 114 has a second threaded portion 120A joined with the first threaded portion 112A. The second threaded portion 120A includes a female thread. The first threaded portion 112A of the housing 112 is provided with a male thread joined with the female screw of the second threaded portion 120A.

The second part 122 of the first mounting portion 114 extends in a second direction that intersects with the first direction in which the second threaded portion 120A is joined with and moved by the first threaded portion 112A. The first direction is a direction parallel to the axial direction of the crankshaft 32A. The inner circumferential portion 136A of the mounting member 136 contacts the first mounting portion 114.

As shown in FIG. 15, the first mounting portion 114 further includes a tool engagement portion 126 that is engageable with a tool. Preferably, the tool engagement portion 126 is defined in the annular member 124 by at least one of the inner circumferential portion 124A and the outer circumferential portion 124B. In the present embodiment, the tool engagement portion 126 is defined by the inner circumferential portion 124A of the annular member 124. The tool engagement portion 126 includes projections and recesses that are projected and recessed in the radial direction of the crankshaft 32A. Preferable, the projections and recesses are alternately at predetermined intervals in the circumferential direction around the crankshaft 32A.

The second mounting portions 116 include a first through hole 116A and a second through hole 116B, which are formed in the housing 112, and first coupling members 140. The second mounting portion 116 includes a plurality of projections 113 projecting from the outer circumferential portion of the first housing 112X around the crankshaft 32A. The projections 113 include a first projection 113A and a second projection 113B. The first projection includes the first through hole 116A, and the second projection 113B includes the second through hole 116B. Preferably, there is plurality of first projections 113A. The first through hole 116A and the second through hole 116B extend in the first direction. Preferably, the diameter of the second through hole 116B is larger than the diameter of the first through hole 116A. The present embodiment provides two first projections 113A and one second projection 113B. Preferably, as viewed in the axial direction C of the crankshaft 32A, the rotation axis of the crankshaft 32A is located in a first range surrounded by adjacent straight lines connecting the centers of the first through holes 116A with the center of the second through hole 116B and a straight line connecting the centers of the first through holes 116A. Preferably, the crankshaft 32A is located in the first range. There can be three or more first through holes 116A and two or more second through holes 116B. One of the first through holes 116A is preferably provided so that the crankshaft 32A is located between the motor 48 and the first through hole 116A as viewed in the axial direction of the crankshaft 32A. Preferably, the second through hole 116B and the other one of the first through holes 116A are provided at positions where the first housing 112X and the third housing 112Z are connected to each other. Preferably, the other one of the first through holes 116A and the second through hole 116B are provided at the two end portions of the third housing 112Z in the width direction around the crankshaft 32A as viewed in the axial direction of the crankshaft 32A. The first through holes 116A and the second through hole 116B do not have to be formed in the first projections 113A and the second projection 113B of the first housing 112X. The first through holes 116A and the second through hole 116B can be provided in the outer circumferential portion of the first housing 112X. The first housing 112X does not have to be provided with both of the first projections 113A and the second projection 113B and can be provided with only the first projections 113A. In this case, only the first through holes 116A are provided in the housing 112, and a structure connecting a sleeve 150 in the second through hole 116B with a bolt is replaced by a structure connecting a bolt inserted into the first through hole 116A with is connected to a threaded portion 146A in the second side wall 146.

The second mounting portions 116 include a plurality of mounting surfaces 117. Each of the mounting surfaces 117 includes a first mounting surface 117A and a second mounting surface 117B. The first through hole 116A opens in the first mounting surface 117A. The second through hole 116B opens in the second mounting surface 117B. The first mounting surface 117A is formed on the first projection 113A. The second mounting surface 117B is formed on the second projection 113B. The first mounting surface 117A and the second mounting surface 117B extend in a direction perpendicular to the rotation axis of the crankshaft 32A. The first mounting surface 117A is offset from the second mounting surface 117B in the axial direction C of the crankshaft 32A. Preferably, the first mounting surface 117A is located closer to the first mounting portion 114 in the axial direction C of the crankshaft 32A than the second mounting surface 117B. The second side wall 146 includes a first frame mounting portion 147A corresponding to the first mounting surface 117A and a second frame mounting portion 147B corresponding to the second mounting surface 117B. The first frame mounting portion 147A is offset from the second frame mounting portion 147B in the axial direction C of the crankshaft 32A. Preferably, the first frame mounting portion 147A is located closer to the first mounting portion 114 in the axial direction C of the crankshaft 32A than the second frame mounting portion 147B. The first through hole 116A and the second through hole 116B are preferably provided so as not to overlap a line segment connecting the rotation axis of the crankshaft 32A and the rotation axis of the rear wheel 30 as viewed from the axial direction C of the crankshaft 32A. Preferably, the first through hole 116A and the second through hole 116B are offset from the portion where the seat tube 22E is connected to the upper wall 148 and the portion where the chain stay 22G is connected to the upper wall 148.

Figure 21:
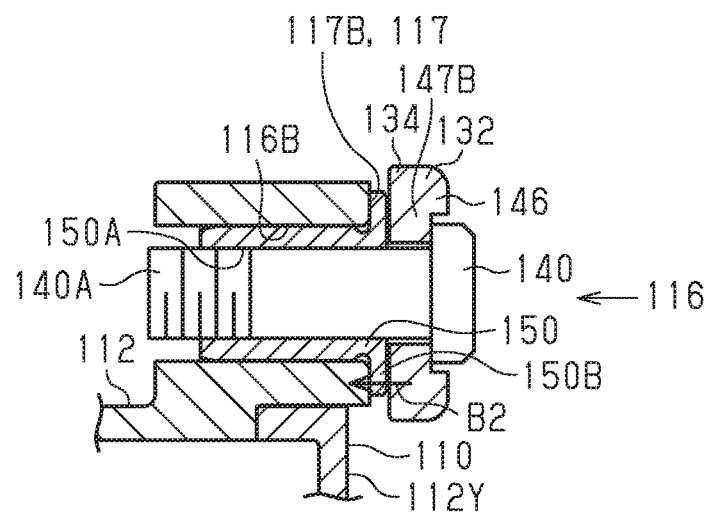
FIG. 21 is a cross-sectional view of a portion of the bicycle component illustrated in FIGS. 13 to 18 as seen along section along line D21-D21 in FIG. 15.

As shown in FIG. 21, the sleeve 150 is arranged in the second through hole 116B. Preferably, the sleeve 150 is pressed-fitted into the second through hole 116B of the second projection 113B. The sleeve 150 includes one axial end defining a flange 150B. The outer diameter of the flange 150B is larger than the inner diameter of the second through hole 116B. The flange 150B is located between the second projection 113B and the frame main body 134. The sleeve 150 is configured so that the position in the second through hole 116B can be adjusted in the extending direction of the second through hole 116B. The inner circumferential portion 150A of the sleeve 150 includes a female thread.

As shown in FIGS. 19 and 21, each of the first coupling members 140 includes a male thread 140A. The first coupling members 140 are inserted through the first through holes 116A and the second through hole 116B. The first coupling member 140 inserted into the first through hole 116A extends through the first through hole 116A and joins with the corresponding threaded portion 146A in the second side wall 146. The frame 132 includes the threaded portion 146A into which the first coupling member 140 can be inserted at a position corresponding to each first through hole 116A. The threaded portion 146A includes a female thread. The first coupling members 140 include bolts. The housing 112 is sandwiched between the bolt head of the first coupling member 140 inserted through each first through hole 116A and the second side wall 146 of the frame 132.

The first coupling member 140 inserted through the second through hole 116B is connected to the female thread of the inner circumferential portion 150A of the sleeve 150. The second side wall 146 of the frame 132 is sandwiched between the housing 112 and the bolt head of the first coupling member 140 inserted through the second through hole 116B. In the frame 132, a through hole into which the first coupling member 140 can be inserted is formed at a position corresponding to the second through hole 116B. When mounting the bicycle component 110 on the frame 132, the first coupling members 140 are inserted into the first through holes 116A and connected to the corresponding threaded portions 146A in the second side wall 146 to fix the frame 132 and the housing 112. Then, the remaining first coupling member 140 is inserted through the through hole of the frame 132 and connected to the second through hole 116B. When there is a gap between the flange of the sleeve 150 and the frame 132, the connection of first coupling member 140 moves the sleeve 150 toward the frame 132 so that the flange 150B contacts the frame 132.

As shown in FIGS. 19 and 20, the first mounting portion 114 is configured to apply force to the housing 112 and the frame 132 acting to move the housing 112 and the frame 132 away from each other. The first mounting portion 114 is configured to apply force to the housing 112 and the frame 132 acting to move away the housing 112 and the frame 132 in the axial direction C of the crankshaft 32A. More specifically, by joining the second threaded portion 120A with the first threaded portion 112A, the first part 120 applies force to the housing 112 in direction A1 toward the second mounting portions 116 because of the axial force of the annular member 124. The second part 122 applies force in direction A2, which is opposite to direction A1, to the frame 132 with the end surface 124C of the annular member 124.

As shown in FIGS. 19 and 21, the second mounting portions 116 is configured to apply force to the housing 112 and the frame 132 acting to move the housing 112 and the frame 132 toward each other. The second mounting portions 116 are configured to apply force to the housing 112 and the frame 132 acting to move the housing 112 and the frame 132 toward each other in the axial direction C of the crankshaft 32A. More specifically, the first coupling member 140 inserted in the first through hole 116A applies force to the housing 112 acting in direction B1 from the first side wall 144 of the frame 132 toward the surface of the second side wall 146 with the axial force of the first coupling member 140. The first coupling member 140 in the second through hole 116B applies force to the housing 112 acting in direction B2 directed from the second side wall 146 of the frame 132 toward the first side wall 144 with the axial force of the first coupling member 140. Direction B1 and direction B2 are opposite directions.

A method for mounting the bicycle component 110 on the frame 132 will now be described. The method for mounting the bicycle component 110 on the frame 132 includes a first step, a second step, a third step and a fourth step.

In the first step, in a state in which the first mounting portion 114 is mounted on the housing 112 and the mounting member 136 is supported by the first mounting portion 114, a mechanic inserts the bicycle component 110 into the accommodation space of the component mounting portion 142 through the first open portion 132A of the frame 132 from below.

In the second step, the mechanic mounts the housing 112 on the frame 132 with the second mounting portions 116.

In the third step, the mechanic fixes the mounting member 136 to the frame main body 134 with the bolts 138.

In the fourth step, the mechanic engages a tool with the tool engagement portion 126 of the first mounting portion 114 and rotates the first mounting portion 114 in the direction in which the second threaded portion 120A of the first mounting portion 114 separates from the first threaded portion 112A to press the frame 132 with the end surface 124C of the annular member 124 of the first mounting portion 114. The third step can be performed before the first step.

Fifth Embodiment

A bicycle component 110 and a mounting structure 160 of the bicycle component 110 in accordance with the fifth embodiment will now be described with reference to FIGS. 22 to 24. The bicycle component 110 in accordance with the fifth embodiment differs from the bicycle component 40 in accordance with the fourth embodiment only in the construction of a second mounting portion 164 and a mounting structure 160. Otherwise, the bicycle component 110 in accordance with the fifth embodiment is the same as the bicycle component 110 in accordance with the fourth embodiment. Thus, same reference numerals are given to those components that are the same as the corresponding components of the first embodiment. Such components will not be described in detail.

Figure 22:
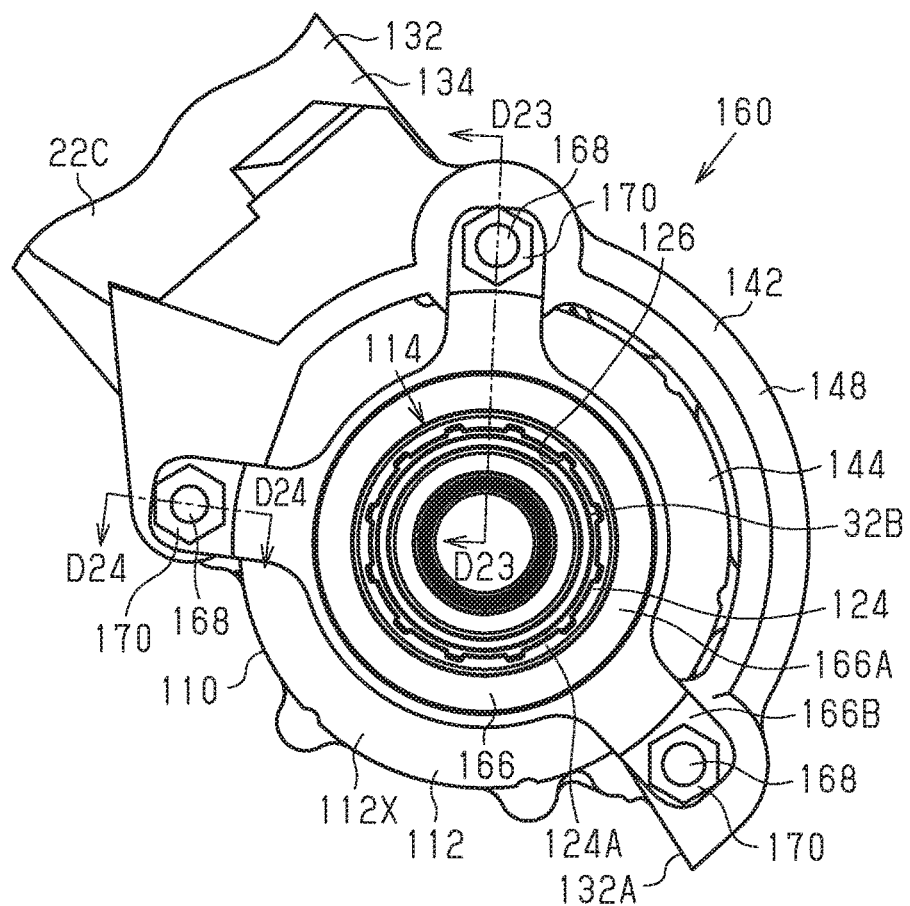
FIG. 22 is a left side elevational view of a bicycle component in accordance with a fifth embodiment in a state mounted on the frame.
Figure 23:
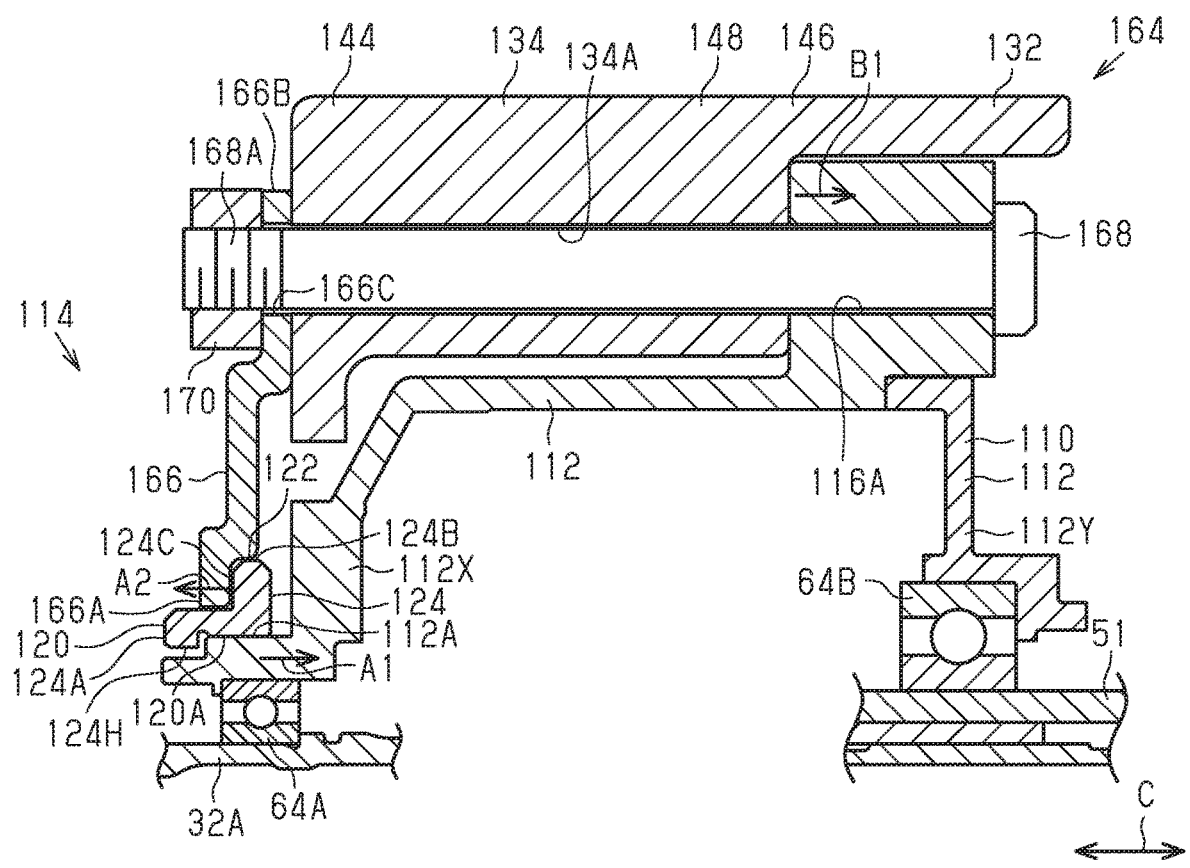
FIG. 23 is a cross-sectional view of a portion of the bicycle component illustrated in FIG. 22 as seen along section line D23-D23 in FIG. 22.
Figure 24:
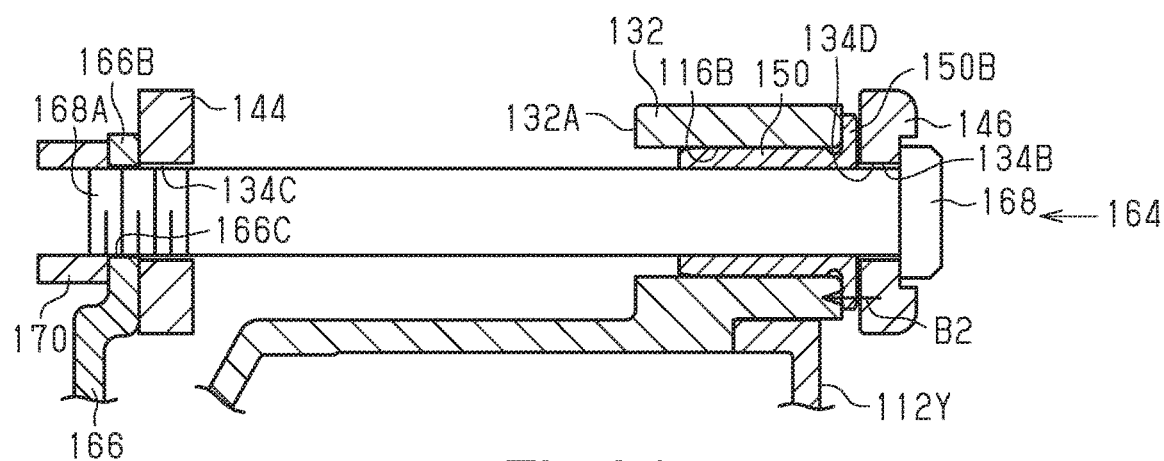
FIG. 24 is a cross-sectional view of a portion of the bicycle component illustrated in FIG. 22 as seen along section along line D24-D24 in FIG. 22.

As shown in FIGS. 22 to 24, the bicycle component 110 includes a housing 112 and the first mounting portion 114. The first mounting portion 114 is configured to mount the housing 112 on the bicycle 10. The bicycle component 110 further includes a plurality of second mounting portions 164 that are configured to mount the housing 112 on the frame 132 of the bicycle 10.

The mounting structure 160 of the bicycle component 110 includes the first mounting portion 114 and the frame 132. The mounting structure 160 further includes the second mounting portions 164. The frame 132 includes a frame main body 134 and a mounting member 166 that is separate from the frame main body 134. The mounting structure 160 further includes a plurality of bolts 168 that are used to mounting the mounting member 166 on the frame main body 134. The mounting structure 160 further includes nuts 170 coupled to the bolts 168. FIG. 22 does not show the seat tube 22E and the chain stay 22G.

The mounting member 166 is ring-shaped. The mounting member 166 includes an inner circumferential portion 166A and an outer circumferential portion 166B. The inner circumferential portion 166A is ring-shaped. The inner circumferential portion 166A of the mounting member 166 is similar in shape to the inner circumferential portion of the mounting member 136. The outer circumferential portion 166B projects outward in the radial direction from the inner circumferential portion 166A. There is a plurality of outer circumferential portions 166B. The outer circumferential portions 166B are non-continuous in the circumferential direction. The outer circumferential portions 166B can be continuous in the circumferential direction. Each outer circumferential portion 166B includes a through hole 166C. The outer circumferential portions 166B of the mounting member 166 are coupled to the frame main body 134.

The second mounting portions 164 include a first through hole 116A, a second through hole 116B the bolts 168 and the nuts 170. The first through hole 116A and the second through hole 116B extend through the housing 112. The sleeve 150 is arranged in the second through hole 116B. The bolts 168 are inserted into the first through hole 116A and the second through hole 116B. The inner circumferential portion 150A of the sleeve 150 includes a female thread joined with the bolt 168.

The second mounting portions 164 function to mount the housing 112 on the frame 132 with the bolts 168 and the nuts 170 and to mount the mounting member 166 on the frame main body 134.

A first frame through hole 134A and a second frame through hole 134B extend through the frame main body 134 in the axial direction C of the crankshaft 32A. As shown in FIG. 23, in a state in which the bicycle component 110 is mounted on the frame main body 134, the first through hole 116A is aligned with the first frame through hole 134A. The first frame through hole 134A is formed in a portion of the frame main body 134 where the upper wall 148 connects the first side wall 144 and the second side wall 146. The first frame through hole 134A extends through the first side wall 144, the upper wall 148, and the second side wall 146 in the first direction. The bolt 168 inserted into the first through hole 116A is extended through the first through hole 116A, the first frame through hole 134A, and the through hole 166C of the mounting member 166 from the side of the second side wall 146. The nut 170 is coupled to the male thread at the distal end of the bolt 168 from the side of the mounting member 166 opposite to the frame main body 134. The bolt 168 in the first through hole 116A can be extended through the through hole 166C of the mounting member 166, the first frame through hole 134A, and the first through hole 116A from the mounting member 166, and the nut 170 can be coupled to the male thread of the distal end 168A of the bolt 168 from side of the second housing 112Y. The bolt 168, which is arranged in the first through hole 116A, and the nut 170 sandwich the housing 112, the frame main body 134, and the mounting member 166 between the bolt head and the nut 170.

As shown in FIG. 24, in a state in which the bicycle component 110 is mounted on the frame main body 134, the second through hole 116B is aligned with the second frame through hole 134B. The second frame through hole 134B includes a first portion 134C and a second portion 134D. The first portion 134C is defined where the upper wall 148 does not connect the first side wall 144 and the second side wall 146. Further, the first portion 134c extends through the first side wall 144 in the first direction. The second portion 134D extends through the second side wall 146 in the first direction. The bolt 168 inserted into the second through hole 116B extends from the second side wall 146 through the second portion 134D of the second frame through hole 134B, the second through hole 116B, the first portion 134C of the second frame through hole 134B, and the corresponding through hole 166C of the mounting member 166. The nut 170 is coupled to the male thread at the distal end of the bolt 168 from the side of the mounting member 166 opposite to the frame main body 134. The bolt 168, which is inserted through the second through hole 116B, and the nut 170 sandwich the second side wall 146 of the frame main body 134 between the bolt head and the flange 150B of the sleeve 150. The bolt 168 and the nut 170 also sandwich the mounting member 166 between the nut 170 and the first side wall 144 of the frame main body 134.

The second mounting portions 164 are configured to apply force to the housing 112 and the frame 132 that moves the housing 112 and the frame 132 toward each other. The second mounting portions 164 are configured to apply force to the housing 112 and the frame 132 approach each other that move the housing 112 and the frame 132 toward each other in the axial direction C of the crankshaft 32A. More specifically, the bolt 168 inserted into the first through hole 116A applies force to the housing 112 acting in direction B1 from the first side wall 144 of the frame 132 toward the surface of the second side wall 146 with the axial force of the bolt 168.

A method for mounting the bicycle component 110 on the frame 132 will now be described. The method for mounting the bicycle component 110 on the frame 132 includes a first step, a second step, a third step, and a fourth step.

In the first step, in a state in which the first mounting portion 114 is mounted on the housing 112 and the mounting member 136 is supported by the first mounting portion 114, the mechanic inserts the bicycle component 110 into the accommodation space of the component mounting portion 142 through the first open portion 132A of the frame 132 from below.

In the second step, the mechanic inserts each bolt 168 through the first through hole 116A of the housing 112, the first frame through hole 134A, and the through hole 166C of the mounting member 166. Then, the mechanic connects the nut 170 to the bolt 168 to fix the housing 112 and the mounting member 166 to the frame main body 134. Further, the mechanic inserts the bolt 168 into the second frame through hole 134B, the second through hole 116B, and the through hole 166C of the mounting member 166 until the flange 150B of the sleeve 150 contacts the second side wall 146. Then, the mechanic connects the nut 170 to the bolt 168 to fix the mounting member 166 and the frame main body 134.

In the third step, the mechanic engages a tool with the tool engagement portion 126 of the first mounting portion 114 and rotates the first mounting portion 114 in the direction in which the second threaded portion 120A of the first mounting portion 114 separates from the first threaded portion 112A to press the mounting member 166 with the end surface 124C of the annular member 124 of the first mounting portion 114.

Modifications

The description related with the above embodiment exemplifies, without any intention to limit, an applicable form of a bicycle component according to the present disclosure. In addition to the embodiments described above, the bicycle component according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiment. Such components will not be described in detail.

Figure 25:
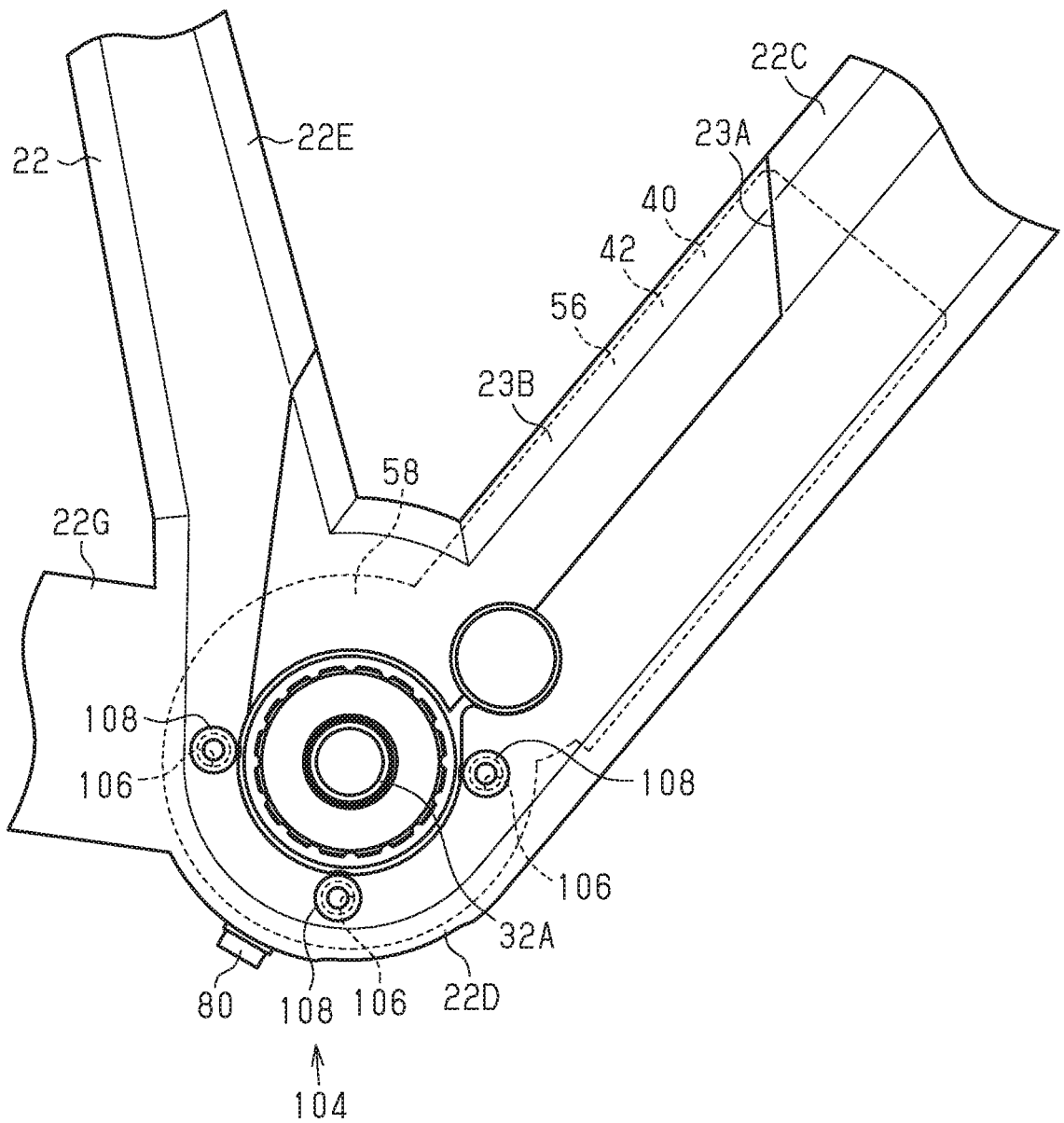
FIG. 25 is a right side elevational view of the portion in the vicinity of the crankshaft of a bicycle including a first modification of the bicycle component.

The second mounting portion 46 of the first and second embodiments can be changed to a second mounting portion 104 shown in FIG. 25. The second mounting portion 104 includes a plurality of threaded holes 106 and a plurality of the first coupling members 108. The threaded holes 106 are formed in the housing 42. The first coupling members 108 are bolts. The first coupling members 74 is extended through the frame 22 and coupled to the threaded holes 106. The first coupling members 108 include male threads joined with female threads of the threaded holes 106. The threaded holes 106 and the first coupling members 108 are arranged at intervals around the crankshaft 32A.

Figure 26:
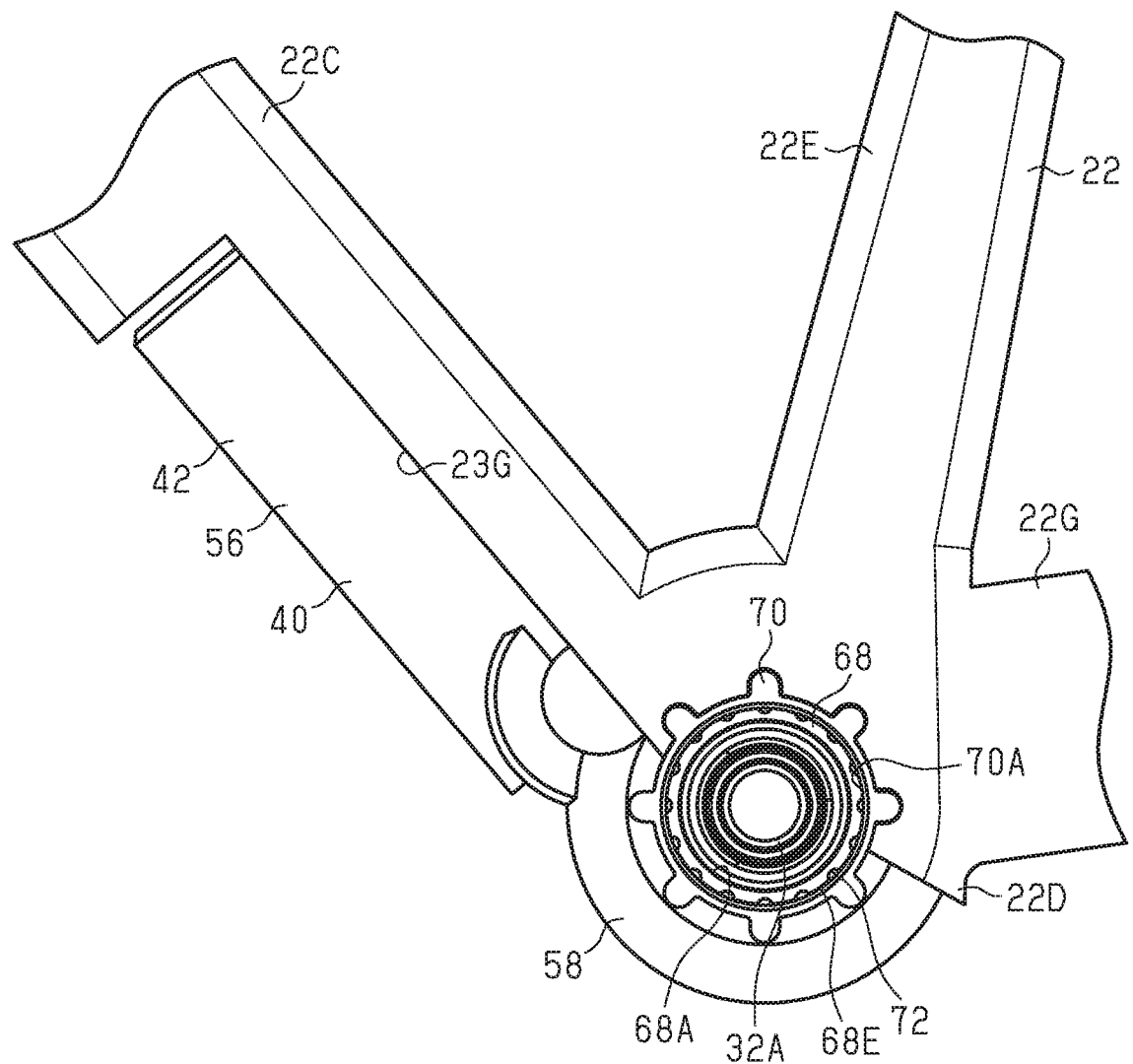
FIG. 26 is a left side elevational view of a portion in the vicinity of the crankshaft of a bicycle in a second modification.
Figure 27:
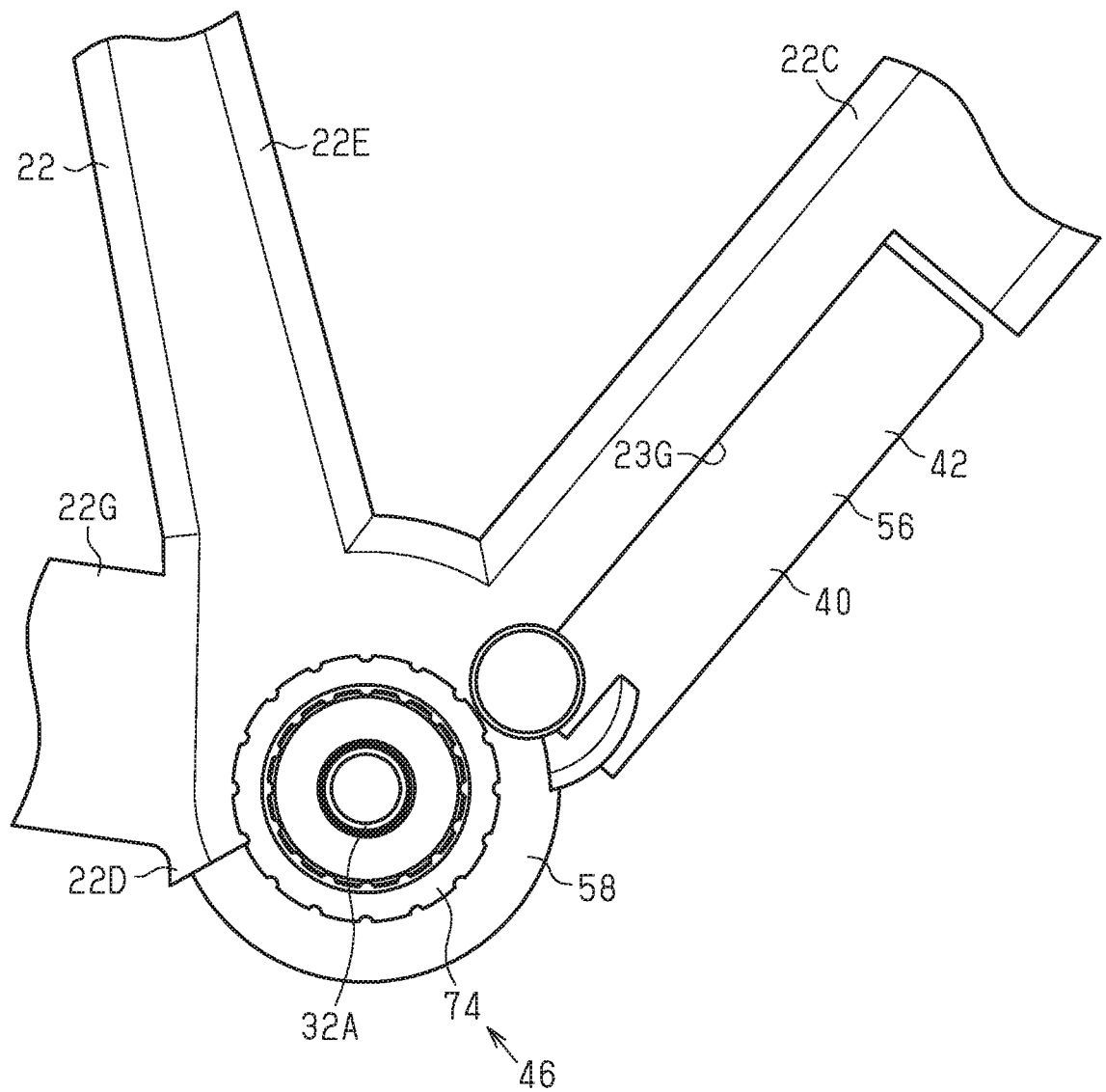
FIG. 27 is a right side elevational view of the portion in the vicinity of the crankshaft of the bicycle illustrated in FIG. 26.

As shown in FIGS. 26 and 27, in the first embodiment, instead of the first open portion 23A, the frame 22 can include a first open portion 23G that opens toward the lower side of the bicycle 10. The first open portion 23G is provided over the lower part of the component mounting portion 22D and the portion of the down tube 22C connected to the component mounting portion 22D. The bicycle component 40 is inserted into the opening of the first open portion 23G from the lower side and mounted on the frame 22. The opening of the first open portion 23G extends rearward in the side walls 23D and 23E of the component mounting portion 22D from where the crankshaft 32A is provided. Preferably, a cover (not shown) is attached to the first open portion 23G.

Figure 28:
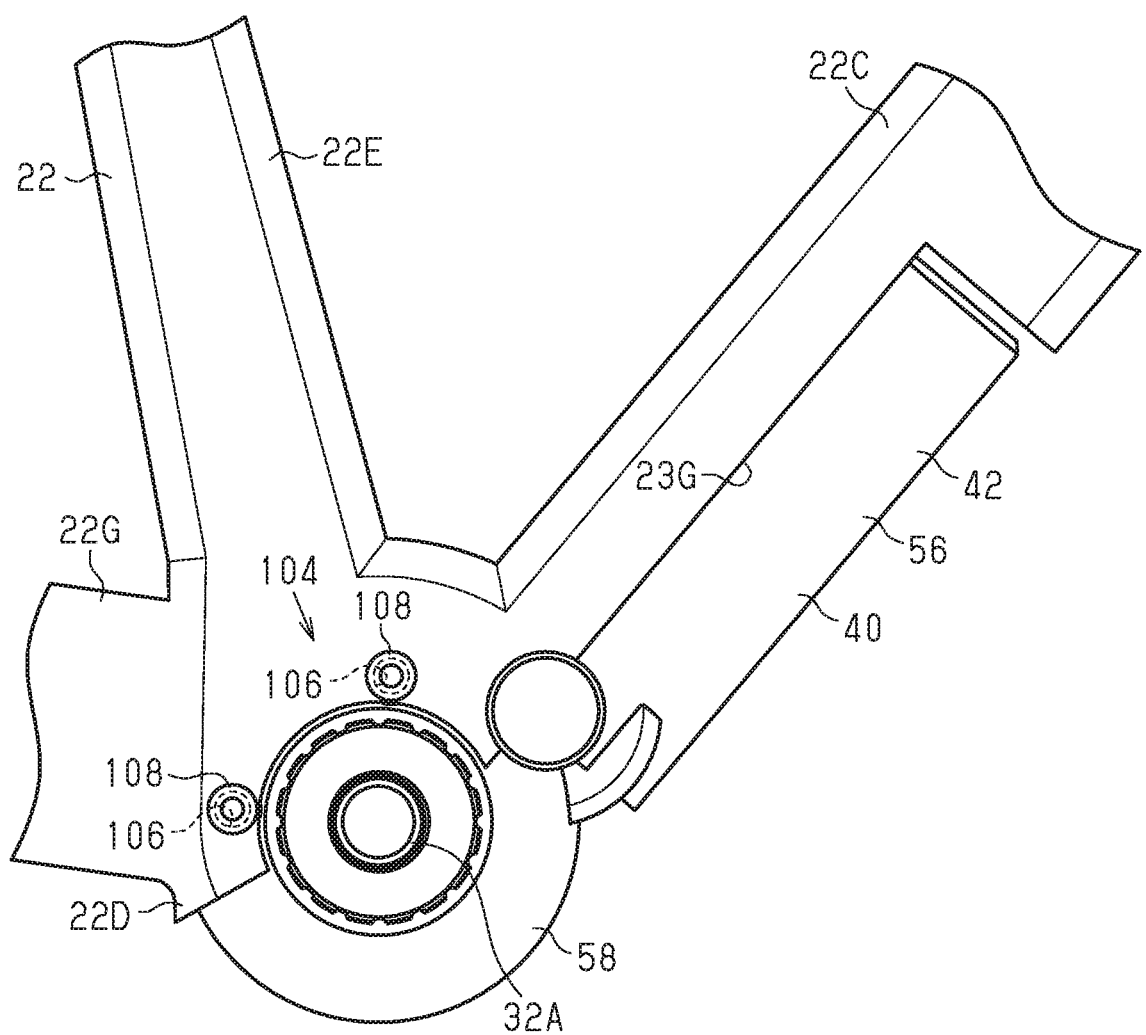
FIG. 28 is a right side elevational view of the portion in the vicinity of the crankshaft of a bicycle in a third modification.

As shown in FIG. 28, in the modification of FIGS. 26 and 27, the first coupling member 74 can be replaced by the first coupling members 108. In the modification shown in FIG. 16, the first mounting portion 44 can be modified to have the same structure as the second mounting portion 46.

In the first embodiment, the second embodiment, and the modification of the first embodiment shown in FIGS. 26 and 27, the second mounting portion 46 can be modified to have the same structure as the first mounting portion 44.

In the first embodiment, the second embodiment, and the modification of the first embodiment shown in FIGS. 26 and 27, the first mounting portion 44 can be modified to have the same structure as the second mounting portion 46.

In the first embodiment, the second embodiment, and the modification of the first embodiment shown in FIGS. 26 and 27, the first mounting portion 44 can be replaced by the second mounting portion 104 shown in FIG. 25.

In the first embodiment, the second embodiment, and their modifications, the first coupling members 74, 95 and 108 can each be shaped to have the form of a non-continuous ring. For example, the first coupling members 74, 95 and 108 can each be C-shaped.

In the first to third embodiments and their modifications, at least one of the first members 68 and 102 and the second member 70 can be shaped to have the form of a non-continuous ring. For example, the first members 68 and 102 and the second member 70 can be C-shaped.

In the first to third embodiments and their modifications, the projections 70F can be omitted from the second member 70. In this case, the recesses 22X can be omitted from the frame 22.

A transmission can be provided in the housings 42, 94 and 112 of the bicycle components 40, 92 and 110 in lieu of or in addition to the motor 48. In this case, the housings 42, 94 and 112 can accommodate at least part of the transmission. The transmission changes the speed of the rotation input to the crankshaft 32A and outputs the rotation to the front rotation body 36.

In each of the embodiments and modifications, the locations of the first mounting portions 44, 96 and 114 and the second mounting portions 46, 98, 104, 116 and 164 can be changed. For example, the first mounting portions 44, 96, and 114 can be located at the right side of the housings 42, 94, and 112, and the second mounting portions 46, 98, 104, 116 and 164 can be located at the left side of the housing 42.

In each of the embodiments and the modifications, a structure similar to that of the first mounting portions 44, 96 and 114 can be provided at the side of the second side surfaces 42Y and 94Y. In this case, the second mounting portions 46, 98, 104, 116 and 164 can be omitted.

In the fourth and fifth embodiments and their modifications, the first mounting portion 114 can be replaced by the first mounting portion 44 of the first embodiment.

In the fifth embodiment and its modifications, the housing 112 can include only the first through hole 116A and not include the second through hole 116B like in the fourth embodiment.

In the fourth and fifth embodiments and their modifications, the first through hole 116A and the second through hole 116B can be formed in the second housing 112Y.

In the fourth and fifth embodiments and their modifications, the sleeve 150 can be omitted. In this case, female threads joined with the first coupling member 140 can be formed in the inner circumferential portion of the housing 112 defining the second through hole 116B.

What is claimed is:

1. A bicycle component comprising:
   a housing that supports a crankshaft of a bicycle; and
   a first mounting portion that mounts the housing on a frame of the bicycle,
   the first mounting portion being configured to apply a force to the housing and the frame that moves the housing and the frame away from each other.
2. The bicycle component according to claim 1, wherein the first mounting portion includes
   a first member including a male thread and configured to press the housing, and
   a second member including a female thread joined with the male thread of the first member and configured to press the frame.
3. The bicycle component according to claim 2, wherein the first member is configured to be coupled to the second member and moved to press the housing with a first end surface in a first direction.
4. The bicycle component according to claim 3, wherein the first member is configured to support the housing in a direction intersecting the first direction.
5. The bicycle component according to claim 3, wherein the first member includes a first hole extending in the first direction, and
   the housing includes an insertion portion inserted in the first hole of the first member.
6. The bicycle component according to claim 3, wherein the housing includes a second hole extending in the first direction, and
   the first member includes an end in the first direction inserted into the second hole.
7. The bicycle component according to claim 2, wherein at least a part of the second member is provided between the housing and the frame.
8. The bicycle component according to claim 2, wherein at least a part of the second member is provided between the first member and the frame.
9. The bicycle component according to claim 2, wherein the second member is configured to contact a part of the frame in a direction intersecting the first direction.
10. The bicycle component according to claim 2, wherein at least one of the first member or the second member further includes a tool engagement portion that is engageable with a tool.
11. The bicycle component according to claim 10, wherein
    the tool engagement portion is defined by at least one of an inner circumferential portion or an outer circumferential portion of the first member.
12. The bicycle component according to claim 1, wherein the first mounting portion includes
    a first part joined with to the housing, and
    a second part configured to press the frame away from the housing.
13. The bicycle component according to claim 12, wherein
    the housing includes a first threaded portion,
    the first part of the first mounting portion includes a second threaded portion joined with the first threaded portion, and
    the second part of the first mounting portion extends in a second direction intersecting a first direction in which the second threaded portion is joined with and moved by the first threaded portion.
14. The bicycle component according to claim 13, wherein
    the second threaded portion includes a female thread, and
    the first threaded portion of the housing is provided with a male thread joined with the female thread of the second threaded portion.
15. The bicycle component according to claim 13, wherein
    the first threaded portion of the housing surrounds an outer circumferential surface of the crankshaft about a rotation axis of the crankshaft.
16. The bicycle component according to claim 13, wherein
    the first mounting portion includes an annular member including an inner circumferential portion and an outer circumferential portion,
    the first part is defined by the inner circumferential portion, and
    the second part is defined by the outer circumferential portion.
17. The bicycle component according to claim 13, wherein the first mounting portion further includes a tool engagement portion that is engageable with a tool.

18. The bicycle component according to claim 1, further comprising:
a second mounting portion that mounts the housing on the frame of the bicycle,
the first mounting portion and the second mounting portion being spaced apart from each other in a predetermined direction.

19. The bicycle component according to claim 18, wherein
the second mounting portion includes
a threaded hole formed in the housing, and
a coupling member extended through the frame and coupled to the threaded hole.

20. The bicycle component according to claim 1, wherein the housing accommodates at least part of a motor that assists propulsion of the bicycle.

21. The bicycle component according to claim 1, wherein the housing is configured to be at least partially accommodated in the frame.

22. A mounting structure for a bicycle component comprising:
a bicycle frame; and
a first mounting portion that mounts a housing on the bicycle frame of the bicycle, the first mounting portion being configured to apply a force to the housing and the bicycle frame that moves the housing and the bicycle frame away from each other.

23. A mounting structure for a bicycle component comprising:
a bicycle frame including a frame main body and a mounting member that is separate from the frame main body; and
a first mounting portion that mounts a housing on the bicycle frame of the bicycle, the first mounting portion being configured to apply a force to the housing and the bicycle frame that moves the housing and the bicycle frame away from each other, the first mounting portion including
a first part joined with to the housing, and
a second part configured to press the mounting member away from the housing.

24. The mounting structure according to claim 23, wherein
the mounting member is annular and includes an inner circumferential portion and an outer circumferential portion,
the inner circumferential portion contacts the first mounting portion, and
the outer circumferential portion is mounted on the frame main body.

25. The mounting structure according to claim 23, further comprising
a bolt that mounts the mounting member on the frame main body.

* * * * *